United States Patent
Lee et al.

(10) Patent No.: US 10,516,478 B2
(45) Date of Patent: Dec. 24, 2019

(54) CONTROLLER BASED PATH ESTIMATION AND PATH PROVISIONING USING OPTICAL IMPAIRMENT DATA

(71) Applicant: Futurewei Technologies, Inc., Plano, TX (US)

(72) Inventors: Young Lee, Plano, TX (US); Yufei Wang, Holmdel, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/987,778

(22) Filed: May 23, 2018

(65) Prior Publication Data
US 2019/0363789 A1 Nov. 28, 2019

(51) Int. Cl.
*H04B 10/25* (2013.01)
*H04B 10/079* (2013.01)
*H04B 10/60* (2013.01)
*H04B 10/50* (2013.01)

(52) U.S. Cl.
CPC ... *H04B 10/0791* (2013.01); *H04B 10/07953* (2013.01); *H04B 10/25* (2013.01); *H04B 10/50* (2013.01); *H04B 10/60* (2013.01)

(58) Field of Classification Search
CPC .. H04B 10/0793; H04B 10/0795; H04J 14/02
See application file for complete search history.

(56) References Cited

U.S. PATENT DOCUMENTS

| 2014/0078895 | A1* | 3/2014 | Iovanna | H04L 45/22 370/228 |
| 2015/0256253 | A1* | 9/2015 | Bottari | H04J 14/0268 398/28 |
| 2016/0191194 | A1* | 6/2016 | Wood | H04J 14/0286 398/58 |
| 2017/0187606 | A1* | 6/2017 | Chen | H04L 45/02 |

OTHER PUBLICATIONS

Vasseur, JP., Ed., "Path Computation Element (PCE) Communication Protocol (PCEP)," RFC 5440, Mar. 2009, 87 pages.
Bjorklund, M., Ed., et al., "Yang—A Data Modeling Language for the Network Configuration Protocol (NETCONF)," RFC 6020, Oct. 2010, 173 pages.

(Continued)

*Primary Examiner* — Dzung D Tran
(74) *Attorney, Agent, or Firm* — Conley Rose, P.C.

(57) ABSTRACT

A method implemented by a domain controller in a network comprises transmitting, by a transmitter of the domain controller to a super controller, an update message comprising path information for one or more parallel paths having a common wavelength from a source to a destination, wherein the one or more parallel paths are free of optical impairments when the update message is transmitted to the super controller, receiving, by a receiver of the domain controller from the super controller, an initiate message comprising an identifier of a path selected from the one or more parallel paths, and provisioning, by a processor of the domain controller, the path based on a verification that the path selected by the super controller is free of optical impairments.

20 Claims, 19 Drawing Sheets

(56) References Cited

OTHER PUBLICATIONS

Enns, R., Ed., et al., "Network Configuration Protocol (NETCONF)," RFC 6241, Jun. 2011, 113 pages.
Bierman, A., et al., "RESTCONF Protocol," RFC 8040, Jan. 2017, 137 pages.
Akula, G., et al., "A Survey on Static Routing Wavelength Assignment Considering Physical Layer Impairments in Wavelength Division Multiplexing Optical Networks," IEEE Communications Surveys & Tutorials, vol. 11, No. 4, Jan. 2009, 32 pages.
Chava, V.S., et al., "Effects of Impairment Modeling Errors on Reachability Graph based Lightpath Setup in Translucent Optical Networks," 15th International Conference on Optical Network Design and Modeling, Feb. 8-10, 2011, 6 pages.
Lee, Y., "A Yang Data Model for ACTN VN Operation," draft-Iee-teas-actn-vn-yang-12, Feb. 27, 2018, 53 pages.
Huang, Y., et al., "Connection Provisioning With Transmission Impairment Consideration in Optical WDM Networks With High-Speed Channels," Journal of Lightwave Technology, vol. 23, No. 3, Mar. 2005, pp. 982-993.
Dizdarevic, H., et al., "A Survey on physical layer Impairments Aware Routing and Wavelength Assignment Algorithms in transparent wavelength routed optical networks," MIPRO, May 30-Jun. 3, 2016, pp. 530-536.
Iyer, S., et al., "Physical Layer Impairment-Aware Routing and Wavelength Assignment (PLI-RWA) Strategy for Mixed Line Rate (MLR) Wavelength Division Multiplexed (WDM) Optical Networks," 2015, 5 pages.
Manousakis, K., "Offline Impairment-Aware Routing and Wavelength Assignment Algorithms in Translucent WDM Optical Networks," Journal of Lightwave Technology, vol. 27, No. 12, Jun. 15, 2009, pp. 1866-1877.
Azodolmolky, S., et al., "A survey on physical layer impairments aware routing and wavelength assignment algorithms in optical networks," Elsevier, Computer Networks 53, 2009, pp. 926-944.
Politi, C., et al., "Physical Layer Impairment Aware Routing Algorithms based on Analytically Calculated Q-factor," OFG1.pdf, 2006, 3 pages.
Saradhi, C., et al., "Physical Layer Impairment Aware Routing (PLIAR) in WDM Optical Networks: Issues and Challenges," IEEE Communications Surveys & Tutorials, vol. 11, No. 4, Fourth Quarter, 2009, pp. 109-130.
Surya, S., et al., "A Survey on Impairment-Aware Dynamic Routing and Wavelength Assignment," 2015, 30 pages.

* cited by examiner

ORIGINAL TOPOLOGY

CONTROLLER BASED PATH ESTIMATION AND PATH PROVISIONING USING OPTICAL IMPAIRMENT DATA

STATEMENT REGARDING FEDERALLY SPONSORED RESEARCH OR DEVELOPMENT

Not applicable.

REFERENCE TO A MICROFICHE APPENDIX

Not applicable.

FIELD OF INVENTION

The present disclosure pertains to the field of telecommunications. In particular, the present disclosure relates generally to networking mechanisms in a controller based network and also to improved methods and apparatuses for estimating and creating tunnels between endpoints in a controller based network.

BACKGROUND

Software defined network (SDN) is a networking paradigm that decouples network control and forwarding functions. The decoupling of the control plane from the data plane allows for centralization of network control, enabling effective policy administration and flexible management. The centralization of network control facilitates various network functionalities, such as network measurements, traffic engineering, enhanced quality of services, and enhanced access control. With the growing availability of SDN-enabled nodes and protocols, many organizations have started deploying SDN networks.

In a SDN, a controller computes end-to-end paths based on an abstract topology of the underlying one or more domain networks. The SDN controller may receive information to create the abstract topology from nodes and/or domain controllers within the underlying network. The abstract topology typically does not include any data related to a condition of nodes or links within the underlying network.

SUMMARY

According to one aspect of the present disclosure, there is provided a method implemented by a domain controller in a network. The method comprises transmitting, by a transmitter of the domain controller to a super controller, an update message comprising path information for one or more parallel paths having a common wavelength from a source to a destination, wherein the one or more parallel paths are free of optical impairments when the update message is transmitted to the super controller, receiving, by a receiver of the domain controller from the super controller, an initiate message comprising an identifier of a path selected from the one or more parallel paths, and provisioning, by a processor of the domain controller, the path based on a verification that the path selected by the super controller is free of optical impairments.

Optionally, in any of the preceding aspects, another implementation of the aspect provides that the one or more parallel paths comprises a first path from the source to the destination and a second path from the source to the destination, and wherein the first path comprises links that are disjoint from links on the second path.

Optionally, in any of the preceding aspects, another implementation of the aspect provides that the path information comprises at least one of an identifier of each of the parallel paths, a bandwidth of each of the parallel paths, a latency of each of the parallel paths, an optical signal-to-noise ratio (OSNR) of each of the parallel paths, a bit error rate (BER) threshold of each of the parallel paths, a quality factor (Q-factor) of each of the parallel paths, or a power level at each of the parallel paths.

Optionally, in any of the preceding aspects, another implementation of the aspect provides that wherein provisioning the path comprises provisioning, by the processor of the network element (NE), the path for the source and the destination based on a determination that the path is free of optical impairments.

Optionally, in any of the preceding aspects, another implementation of the aspect provides that wherein provisioning the path comprises transmitting, by the transmitter to the super controller, a failure message indicating that an optical impairment has occurred on the path, and receiving, by the receiver from the super controller, a second identifier of a second path selected from the one or more parallel paths.

Optionally, in any of the preceding aspects, another implementation of the aspect provides that the method further comprises determining, by the processor, a plurality of sets of parallel paths between the source and the destination having the common wavelength available, determining, by the processor, an optimal set of parallel paths for the common wavelength based on a network constraint, wherein the path information describes each path in the optimal set of parallel paths.

Optionally, in any of the preceding aspects, another implementation of the aspect provides that the update message further comprises path information for one or more viable paths between a plurality of different source and destination pairs.

According to one aspect of the present disclosure, there is provided an apparatus implemented as a super controller. The apparatus comprises a memory storage comprising instructions, and one or more processors in communication with the memory storage, wherein the one or more processors execute the instructions to receive an update message comprising path information for one or more parallel paths between a source and destination from a domain controller, the one or more parallel paths being free of optical impairments when the update message is received by the super controller, the one or more parallel paths having a common wavelength, select a path from the one or more parallel paths based on a network constraint, and transmit an initiate message comprising an identifier of the path to the domain controller.

Optionally, in any of the preceding aspects, another implementation of the aspect provides that the one or more processors are further configured to transmit a second identifier of a second path to the domain controller in response to receiving a failure message from the domain controller.

Optionally, in any of the preceding aspects, another implementation of the aspect provides that the failure message indicates that an optical impairment has occurred on the path, and wherein the second path is selected from the one or more parallel paths based on the network constraint.

Optionally, in any of the preceding aspects, another implementation of the aspect provides that the initiate message further comprises a length field indicating a total length of the initiate message.

Optionally, in any of the preceding aspects, another implementation of the aspect provides that the path information comprises at least one of an identifier of each of the parallel paths, a bandwidth of each of the parallel paths, a latency of each of the parallel paths, an optical signal-to-noise ratio (OSNR) of each of the parallel paths, a bit error rate (BER) threshold of each of the parallel paths, a quality factor (Q-factor) of each of the parallel paths, or a power of each of the parallel paths.

Optionally, in any of the preceding aspects, another implementation of the aspect provides that each of the parallel paths has links that are disjoint from one another.

Optionally, in any of the preceding aspects, another implementation of the aspect provides that the one or more processors are further configured to receive information regarding a presence of an optical impairment on the path from the domain controller.

According to one aspect of the present disclosure, there is provided a non-transitory medium configured to store a computer program product comprising computer executable instructions that when executed by a processor cause the processor to transmit an update message comprising path information to a super controller, the path information being for one or more parallel paths having a common wavelength from a source to a destination, the one or more parallel paths being free of optical impairments when the update message is transmitted to the super controller, receive an initiate message comprising an identifier of a path selected from the one or more parallel paths from the super controller, and provision the path based on a verification that the path selected by the super controller is free of optical impairments.

Optionally, in any of the preceding aspects, another implementation of the aspect provides that the one or more parallel paths comprises a first path from the source to the destination and a second path from the source to the destination, and wherein the first path comprises links that are disjoint from links on the second path.

Optionally, in any of the preceding aspects, another implementation of the aspect provides that the path information comprises at least one of an identifier of each of the parallel paths, a bandwidth of each of the parallel paths, a latency of each of the parallel paths, an optical signal-to-noise ratio (OSNR) of each of the parallel paths, a bit error rate (BER) of each of the parallel paths, a quality factor (Q-factor) of each of the parallel paths, or a power of each of the parallel paths.

Optionally, in any of the preceding aspects, another implementation of the aspect provides that the computer executable instructions, when executed by the processor, further cause the processor to provision the path for the source and the destination based on a determination that the path is free of optical impairments.

Optionally, in any of the preceding aspects, another implementation of the aspect provides that the computer executable instructions, when executed by the processor, further cause the processor to transmit a failure message indicating that an optical impairment has occurred on the selected path to the super controller, and receive a second identifier of a second path, wherein the second path is selected from the one or more parallel paths.

Optionally, in any of the preceding aspects, another implementation of the aspect provides that the computer executable instructions, when executed by the processor, further cause the processor to determine a plurality of sets of parallel paths between the source and the destination having the common wavelength available, determine an optimal set of parallel paths for the wavelength based on a network constraint, wherein the path information describes each path in the optimal set of parallel paths.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

Multiple domains may be interconnected by physical or optical links, and each domain may include multiple nodes that are also interconnected by physical or optical links. Each domain may include a domain controller that communicates with a centralized super controller. Each domain controller sends topology information describing a physical topology of the respective domain to the super controller. The super controller may generate an abstraction of all the domains that communicate with the super controller to determine end-to-end paths for a customer based on customer service requirements and network constraints.

Typically, the domain controllers do not send optical impairment information to the super controller. Optical impairment information refers to information that indicates whether a node or a link in a domain is properly functioning and available to forward data. Therefore, domain controllers do not typically determine end-to-end paths while considering the optical impairments of the various links and nodes within each of the domains.

Embodiments of the present disclosure are directed to domain controllers that are configured to send optical impairment information to the super controller. In some embodiments, a super controller is configured to determine end-to-end paths for a customer based not only on the customer service requirements and network constraints, but also on the optical impairment information received from each of the domain controllers. Therefore, embodiments of the present disclosure provide for a more efficient method of path estimation and path provisioning by verifying that the path is free of optical impairments before actually provisioning the path.

Figure 1:
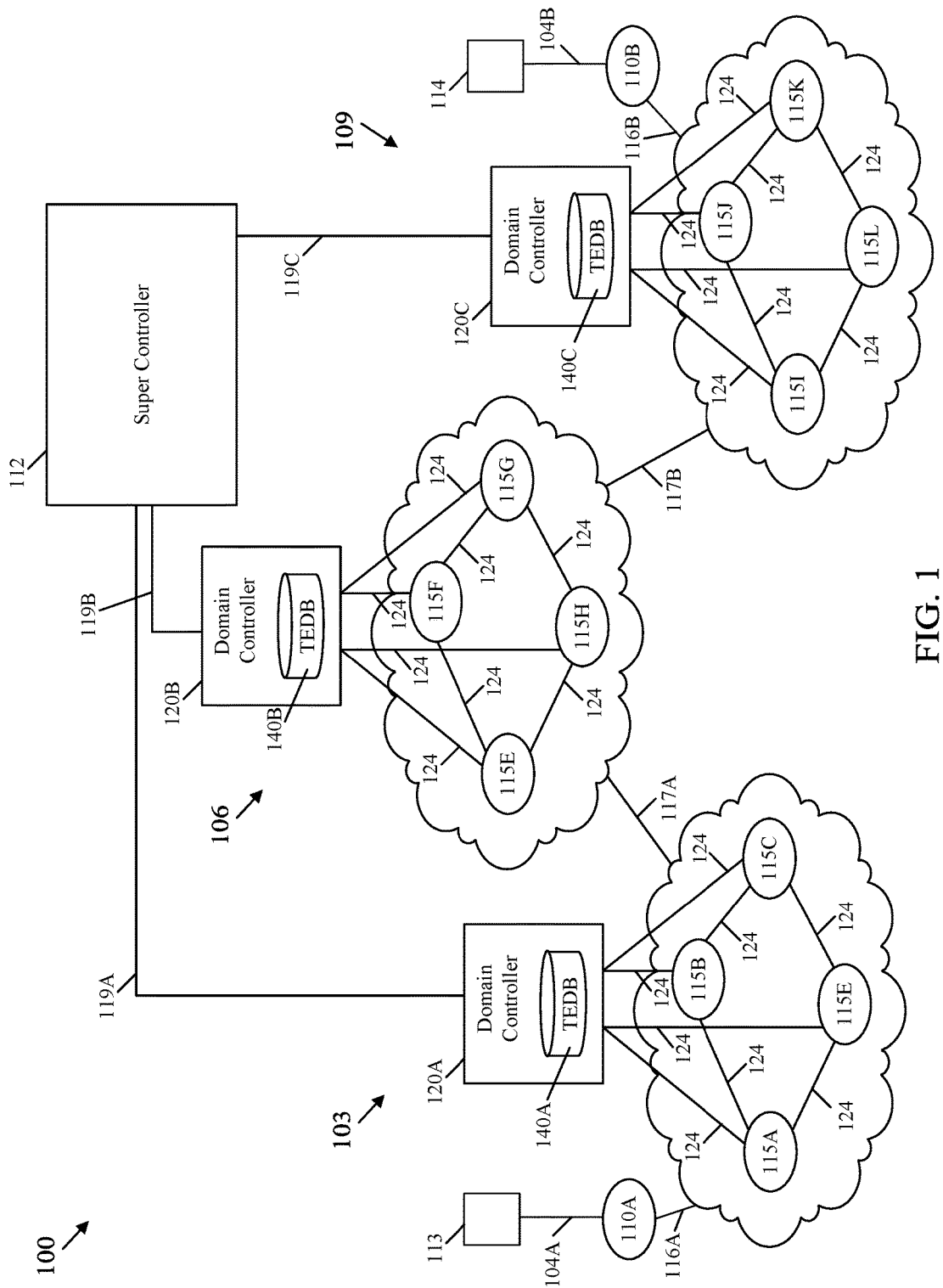
FIG. 1 is a schematic diagram of a network according to an embodiment of the disclosure.

FIG. 1 is a schematic diagram of a network 100 according to an embodiment of the disclosure. In various embodiments, network 100 may implement SDN, Abstraction and Control of Traffic Engineered Networks (ACTN), a YANG data model, a Representational State Transfer Configuration (RESTCONF) protocol, a Network Configuration (NETCONF) protocol, and/or a Path Computation Element Communication Protocol (PCEP). ACTN may be implemented as defined by Internet Engineering Task Force (IETF) document entitled "A Yang Data Model for ACTN VN Operation," version 7, dated Oct. 23, 2017, which is hereby incorporated by reference in its entirety. The YANG data model is implemented as defined by IETF Request for Comments (RFC) 6020 document entitled, "YANG—A Data Modeling Language for the Network Configuration Protocol (NETCONF)," published October 2010, which is hereby incorporated by reference in its entirety. The NETCONF protocol is implemented as defined by IETF RFC 6241 document entitled "Network Configuration Protocol (NETCONF)," dated June 2011, which is hereby incorporated by reference in its entirety. The RESTCONF protocol is implemented as defined by IETF RFC 8040 document entitled, "RESTCONF protocol," dated January 2017, which is hereby incorporated by reference in its entirety. PCEP is implemented as defined by IETF RFC 5440 document entitled, "Path Computation Element (PCE) Communication Protocol (PCEP)," dated March 2009, which is hereby incorporated by reference in its entirety. The underlying infrastructure of the network 100 may be any type of network such as an electrical network, an optical network, or combinations thereof. In an embodiment, the network 100 may employ an Internet protocol (IP) transport layer and a Multiprotocol Label Switching (MPLS) data forwarding plane.

The network 100 is a hierarchical controller network comprising customer edges (CEs) 110A-B, source 113, destination 114, network domains 103, 106, and 109, and a super controller 112. The source 113 may be connected to CE 110A via customer link 104A, and the destination 114 may be connected to CE 110B via customer link 104B. For example, the customer links 104A-B comprise physical links such as fiber optic links, electrical links, wireless links, or logical links connecting the source 113 and destination 114 to the respective CEs 110A-B. The CEs 110A-B may be connected to the network domains 103, 106, and 109 via customer-to-domain links 116A-B. For example, the customer-to-domain link 116A connects the CE 110A to at least one NE in the network domain 103. Similarly, the customer-to-domain link 116B connects the CE 110B to at least one NE in the network domain 109. The customer-to-domain links 116A-B may comprise physical links such as fiber optic links, electrical links, wireless links, or logical links connecting the CEs 110 to an NE in the network domain 103, 106, and 109.

The network domains 103, 106, and 109 may be connected by inter-domain links 117A-B that route data internally and across the inter-domain links 117A-B. An inter-domain link 117 is any link that couples two network domains 103, 106, and 109 via one or more access points (e.g., edge nodes). For example, the inter-domain link 117A couples network domain 103 and 106 via at least one of the NEs in the network domain 103 and at least one of the NEs in the network domain 106. Similarly, the inter-domain link 117B couples network domain 106 and 109 via at least one of the NEs in the network domain 106 and at least one of the NEs in the network domain 109. The inter-domain links 117A-B may comprise physical links such as fiber optic links, electrical links, wireless links, or logical links interconnecting the network domains 103, 106, and 109.

Each of the network domains 103, 106, and 109 may be connected to the super controller 112 via a domain-to-super controller link 119A-C. For example, the domain-to-super controller link 119A connects the network domain 103 to the super controller 112, the domain-to-super controller link 119B connects the network domain 106 to the super controller 112, and the domain-to-super controller link 119C connects the network domain 109 to the super controller 112. The domain-to-super controller links 119A-C may comprise physical links such as fiber optic links, electrical links, wireless links, or logical links connecting the domain controller 120A-C of the network domain 103, 106, and 109 to the super controller 112.

The source 113 and destination 114 may be network devices such as, for example, user equipment (UE), network sites, service providers, or any other type of network device that is configured to be a tunnel endpoint that sends and receives packets throughout network 100. The CEs 110A-B are network devices located at customer sites external to the network domains 103, 106, and 109. For example, the CE 110A is located outside network domain 103, and CE 110B is located outside network domain 109. For example, CEs 110A-B may be routers, bridges, switches, or hosts. The CEs 110A-B may originate and/or terminate customer traffic. Each CE 110 is connected to one or more virtual local area networks (VLANs). Each of the VLANs may be connected to one or more network devices that are implemented as a source 113 and/or a destination 114. In some embodiments, CE 110A is connected to a source 113 via a VLAN, and CE 110B is connected to a destination 114 via a VLAN. In some embodiments, CEs 110A-B are dedicated to a particular customer and connected to one or more of nodes 115A-L in the network domains 103, 106, and 109 via the customer-to-domain links 116A-B.

A network domain 103, 106, and 109 is a group of interconnected hardware and/or software devices administered by common/shared procedures (e.g., common addressing schemes, security procedures, etc.), which are each configured to forward data. In some embodiments, the network domains 103, 106, and 109 each comprise a domain controller 120A-C and a plurality of nodes 115A-L. For example, network domain 103 comprises a domain controller 120A and nodes 115A-D, network domain 106 comprises a domain controller 120B and nodes 115E-G, and network domain 109 comprises a domain controller 120C and nodes 115J-L. In some embodiments, each of the nodes 115A-L in the network domains 103, 106, and 109 are interconnected by links 124. Each of the nodes 115A-L in the network domains 103, 106, and 109 are also connected to the respective domain controller 120A-C via links 124. The links 124 may comprise physical links such as fiber optic links, electrical links, wireless links, or logical links connecting the nodes 115A-L within each network domain 103, 106, and 109. The nodes 115A-L are any devices or components such as routers and switches configured to perform both MPLS signaling to establish Label-Switched Paths (LSPs) and tunnels in the network 100 and data forwarding along the established LSPs and tunnels.

The domain controllers 120A-C, which may also be referred to as Provisioning Network Controllers (PNC), are configured to manage a Traffic Engineering Database (TEDB) 140A-C that contains network topology data and optical impairment data for each of the nodes 115A-L and links 124 within the respective network domain 103, 106, and 109. Network topology data refers to information describing the nodes 115A-L that are connected to each other within a domain and the links 124 and/or ports that connect the nodes 115 A-L to one another within the domain. Network topology data may be used to create an abstraction of the physical topology of the corresponding network domain 103, 106, and 109. Optical impairment data may refer to information describing a condition or level of a node 115 or a link 124 within a network domain 103, 106, and 109. Optical impairment data may include, for example, a latency of each link 124, a bandwidth of each link 124, an optical signal-to-noise ratio (OSNR) of each link 124 and/or node 115, a bit error rate (BER) threshold of each link 124 and/or node 115, a quality factor (Q-factor) of each link 124 and/or node 115, a chromatic dispersion (CD) of each link 124 and/or node 115, a polarization mode dispersion (PMD) of each link 124 and/or node 115, a polarization dependent loss (PDL) of each link 124 and/or node 115, and a power level of each link 124 and/or node 115. As should be appreciated, the optical impairment data may include other information describing a condition of each link 124 and/or node 115 in the network domain 103, 106, and 109.

According to some implementations, each of the nodes 115 A-L in the network domain 103, 106, and 109 is configured to transmit network topology data and optical impairment data related to the respective node 115 A-L and any connecting link 124 to the domain controller 120A-C of the network domain 103, 106, or 109 in which the node 115 is located. For example, the domain controller 120A in network domain 103 maintains TEDB 140A comprising network topology data and optical impairment data for nodes 115A-D and the links 124 connecting each of nodes 115A-D. The domain controller 120B in network domain 106 maintains TEDB 140B comprising network topology data and optical impairment data for nodes 115E-H and the links 124 connecting each of nodes 115E-H. The domain controller 120C in network domain 109 maintains TEDC 140C comprising network topology data and optical impairment data for nodes 115I-L and the links 124 connecting each of nodes 115I-L.

For example, each of the nodes 115 A-L may transmit network topology data and optical impairment data to the domain controller 120A-C using a protocol that supports TEDB, such as, for example, Generalized Multiprotocol Label Switching (GMPLS) or Path Computation Element (PCE) Communication Protocol. In some embodiments, the domain controllers 120A-C may run an abstraction method on the network topology data and send the abstract network topology to the super controller 112.

While FIG. 1 only shows three network domains 103, 106, and 109, it should be appreciated that the network 100 may comprise any number of network domains. Similarly, while FIG. 1 only shows each network domain 103, 106, and 109 including four nodes 115, it should be appreciated that each network domain 103, 106, and 109 may comprise any number of nodes 115 A-L interconnected by any number of links 124.

In some embodiments, the super controller 112, which may also be referred to as a Multi-Domain Service Coordinator (MDSC), is a controller device that is configured to communicate with each of the domain controllers 120A-C and the CEs 110A-B to obtain path requests from customers located at the CEs 110A-B and network data from each of the network domains 103, 106, and 109 connected to the super controller 112. In some embodiments, super controller 112 is a network device located external to the network domains 103, 106, and 109 that is configured to coordinate functions performed by each of the network domains 103, 106, and 109 to estimate paths between the source 113 and destination 114. For example, the super controller 112 may be configured to receive the network topology data from each of the domain controllers 120A-C in the network domains 103, 106, and 109, respectively. In this example, the super controller 112 may use the network topology data to estimate a path between the source 113 and destination 114 in response to, for example, a request from CE 110A indicating that the source 113 is requesting to send data to the destination 114.

The super controller 112 is typically configured to estimate a path between the source 113 and the destination 114 based solely on the network topology information received from each of the domain controllers 120A-C. In this case, the super controller 112 determines a shortest path between the source 113 and destination 114 and sends an identification of the shortest path to each of the domain controllers 120A-C in the network domains 103, 106, and 109. Typically, each of the domain controllers 120A-C are configured to provision the path identified by the super controller 112 without considering any optical impairments that may be occurring within the network domain 103, 106, and 109. This is because typically domain controllers 120A-C are not configured to send the optical impairment data to the super controller 112 such that the super controller 112 may use the optical impairment data to estimate a path between a source 113 and destination 114.

Embodiments of the present disclosure are directed to domain controllers 120A-C that are configured to send the information regarding paths without optical impairments to the super controller 112, as will be further described below. Each of the domain controllers 120A-C may be configured to determine viable paths and parallel paths that maximize throughput for the source 113 and destination 114. Information regarding these viable paths and parallel paths may be transmitted to the super controller 112. For example, the domain controllers 120A-C may filter the information to send only the power levels and OSNRs associated with each link 124 and/or node 115 A-L in the viable paths and parallel paths to the super controller 112, as will be further described below.

In some embodiments, the super controller 112 may be configured to determine an abstract optical traffic engineering (TE) topology based on the network topology data and the information regarding the viable paths and parallel paths received from each domain controller 120A-C. Subsequently, when the super controller 112 receives a request for a path from the source 113 for a path between the source 113 and the destination 114, the super controller 112 may be configured to execute instructions to determine a path from the source 113 to the destination 114 using not only the network topology information but also the optical impairment data.

Embodiments of the present disclosure are also directed to optimizing the path generated between a source 113 and destination 114 by verifying that the path generated by the super controller 112 is still valid at each domain controller 120A-C. For example, after the super controller 112 generates the path between the source 113 and destination 114, the super controller 112 may transmit an identifier of the path to each of the domain controllers 120A-C. In some embodiments, each of the domain controllers 120A-C may search the TEDB 140A-C to determine whether each link 124 and/or each node 115 A-L is still reachable to verify that the path identified by the super controller 112 is free of optical impairments (i.e., optical impairments are not present on the path identified by the super controller 112). When the path identified by the super controller 112 is still reachable (i.e., no optical impairments are present on the path), the domain controllers 120A-C may provision the path and reserve the resources for the path between the source 113 and the destination 114. However, when the path identified by the super controller 112 is no longer reachable (i.e., optical impairments are present or has occurred on the path), the domain controllers 120A-C that identified the optical impairment may notify the super controller 112 that the path identified by the super controller 112 is no longer available. In response, the super controller 112 may be configured to identify another viable path until the domain controllers 120A-C successfully provision the path between the source 113 and the destination 114.

Figure 2:
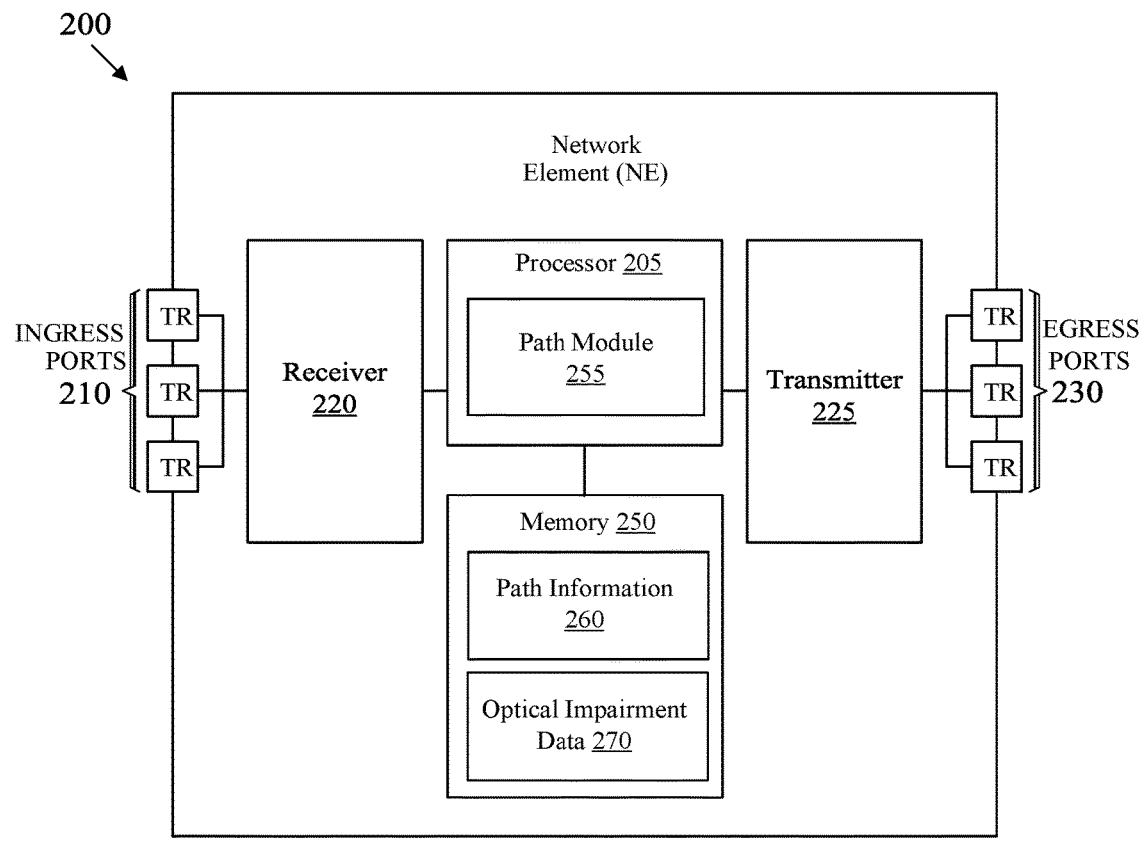
FIG. 2 is a diagram of an embodiment of a network element (NE) in the network.

FIG. 2 is a diagram of an embodiment of a network element (NE) 200 in the network 100. For instance, the NE 200 may be a domain controller 120 or a super controller 112. The NE 200 may be configured to implement and/or support the application service policy specific tunneling mechanisms described herein. The NE 200 may be implemented in a single node or the functionality of NE 200 may be implemented in a plurality of nodes. One skilled in the art will recognize that the term NE encompasses a broad range of devices of which NE 200 is merely an example. The NE 200 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 200. For instance, the features and/or methods in the disclosure may be implemented using hardware, firmware, and/or software installed to run on hardware. As shown in FIG. 2, the NE 200 comprises one or more ingress ports 210 and a receiver unit (Rx) 220 for receiving data, at least one processor, logic unit, or central processing unit (CPU) 205 to process the data, a transmitter unit (Tx) 225 and one or more egress ports 230 for transmitting the data, and a memory 250 for storing the data.

The processor 205 may comprise one or more multi-core processors and be coupled to a memory 250, which may function as data stores, buffers, etc. The processor 205 may be implemented as a general processor or may be part of one or more application specific integrated circuits (ASICs) and/or digital signal processors (DSPs). The processor 205 may comprise a path module 255, which may perform processing functions of the super controller 112 and/or domain controller 120, and implement methods 700, 1100, and 1200, as discussed more fully below, and/or any other method discussed herein. As such, the inclusion of the path module 255 and associated methods and systems provide improvements to the functionality of the NE 200. Further, the path module 255 effects a transformation of a particular article (e.g., the network) to a different state. In an alternative embodiment, path module 255 may be implemented as instructions stored in the memory 250, which may be executed by the processor 205.

The memory 250 may comprise a cache for temporarily storing content, e.g., a random-access memory (RAM). Additionally, the memory 250 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 250 may be configured to store routing databases. In an embodiment, the memory 250 may comprise path information 260 and optical impairment data 270. The path information 260 may comprise information describing the viable paths and the parallel paths that is determined by the domain controller 120 of each network domain 103, 106, and 109, as will be further described below. The optical impairment data 270 may comprise information describing any optical impairments that may be occurring at each of the nodes 115 and links 124 within a network domain 103, 106, and 109.

When NE 200 is a domain controller 120 the Tx 225 is configured to transmit path information for one or more parallel paths having a common wavelength from a source to a destination to the super controller 112. The Rx 220 is configured to receive an identifier of a path selected from the one or more parallel paths from the super controller 112. The path module 255 is executed by the processor 205 to provision the path based on a presence of an optical impairment on the path.

When NE 200 is a super controller 112, the Rx 220 is configured to receive path information for one or more parallel paths between a source and destination from a domain controller, the one or more parallel paths having a common wavelength. The path module 255 is executed by the processor 205 to select a path from the one or more parallel paths based on a network constraint. The Tx 225 is configured to transmit an identifier of the path to the domain controller.

It is understood that by programming and/or loading executable instructions onto the NE 200, at least one of the processor 205 and/or memory 250 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC in a particular machine or apparatus, likewise a computer that has been programmed and/or loaded with executable instructions may be viewed as a particular machine or apparatus.

Figure 3:
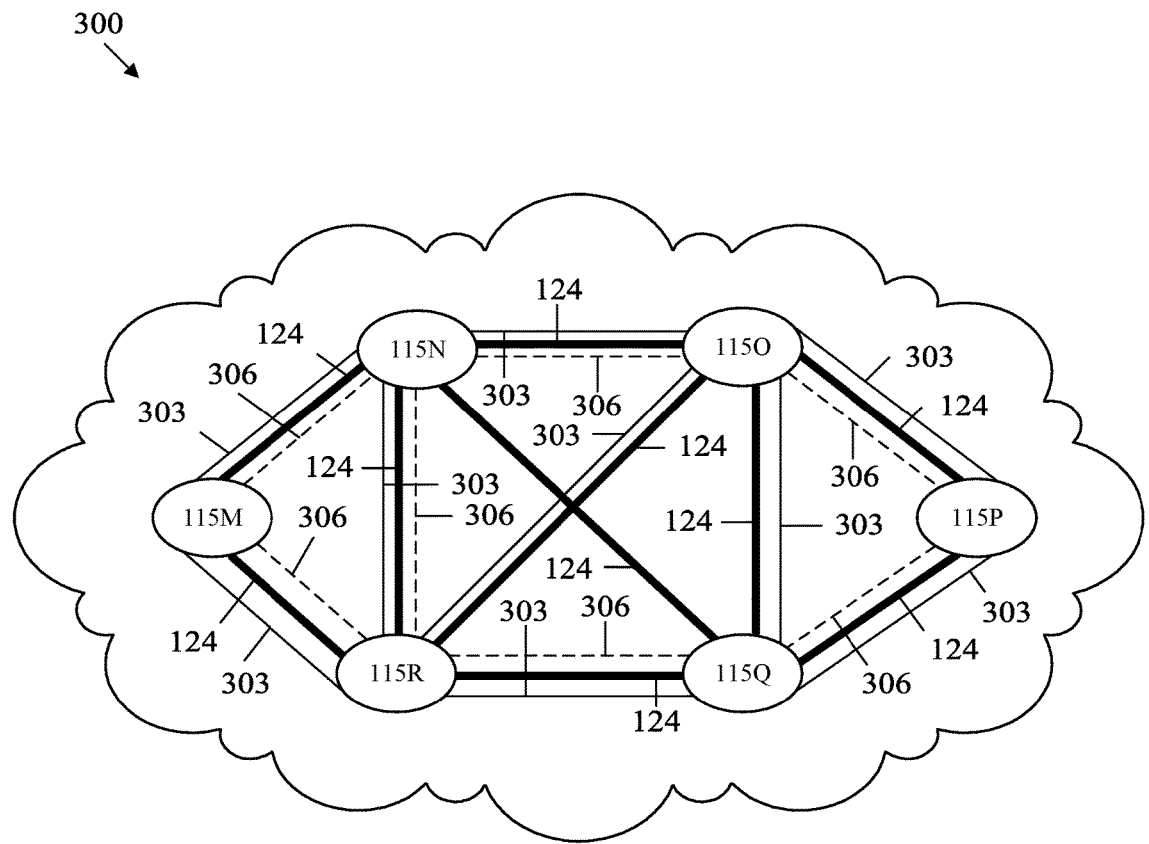
FIG. 3 is a diagram illustrating wavelength availability within a domain according to various embodiments of the disclosure.

FIG. 3 is a diagram illustrating wavelength availability within a domain 300 according to various embodiments of the disclosure. Domain 300 may be similar to network domains 103, 106, and 109. For example, suppose the domain 300 is included in network 100 and includes nodes 115M-R interconnected by links 124. The term wavelength availability refers to an identification of the links 124 in the domain 300 that have certain wavelengths (also referred to herein as lambdas (λs)) that are available across the respective links 124. The term wavelength availability may also be referred to herein as a lambda abstraction.

In some embodiments, a domain controller 120 (not shown) of the domain 300 is configured to determine the wavelength availability within the domain 300. The wavelength availability may be used by the domain controller 120 to determine viable paths and parallel paths within a domain 300, which will be further described below. Each viable path and parallel path consists of multiple nodes 115 interconnected by multiple links 124. Each of the links 124 in the path may have a certain wavelength available by which to transmit data. In some embodiments, a first step in determining viable paths and parallel paths in a domain 300 is to first determine the wavelength availability within the domain 300.

In the implementation shown in FIG. 3, the wavelength availability shows the links 124 having a first λ 303 available (shown by the thin solid line) and the links 124 having a second λ 306 available (shown by the thin dotted line) to transmit data within domain 300. As shown in FIG. 3, each of the links 124 connecting nodes 115M-R may or may not have the first λ 303 or the second λ 306 available to transmit data. For example, the link 124 connecting node 115M and 115N has both the first λ 303 and the second λ 306 available to transmit data. The link 124 connecting node 115N and 115O also has both the first λ 303 and the second λ 306 available to transmit data. The link 124 connecting node 115O and 115P also has both the first λ 303 and the second λ 306 available to transmit data. The link 124 connecting node 115P and 115Q also has both the first λ 303 and the second λ 306 available to transmit data. The link 124 connecting node 115Q and 115R also has both the first λ 303 and the second λ 306 available to transmit data. The link 124 connecting node 115R and 115N also has both the first λ 303 and the second λ 306 available to transmit data. The link 124 connecting node 115R and 115M also has both the first λ 303 and the second λ 306 available to transmit data.

In contrast, the link 124 connecting node 115R and 115O has the first λ 303 available to transmit data but not the second λ 306. Similarly, the link 124 connecting node 115O and 115Q has the first λ 303 available to transmit data but not the second λ 306. The link 124 connecting node 115N and node 115Q does not have either the first λ 303 or the second λ 306 available to transmit data. While only two wavelengths (λs) are illustrated in FIG. 3, it should be appreciated that a wavelength availability determination may be performed for any number of wavelengths available within a domain 300.

FIGS. 4A-D are diagrams illustrating a determination of paths available in a domain 400 for various wavelengths using a wavelength availability of the domain 400 according to various embodiments of the disclosure. Domain 400 may be similar to domains 103, 106, 109, and 300, and domain 400 may include nodes 115A-G interconnected by links 124.

Figure 4A:
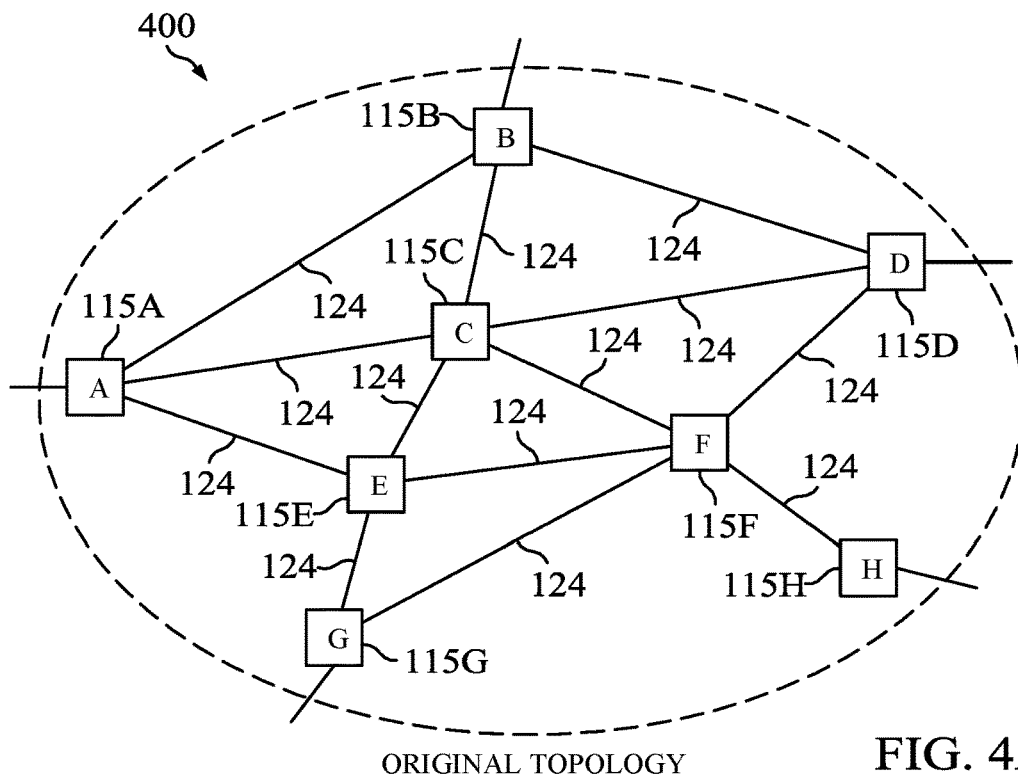
FIGS. 4A-D are diagrams illustrating a determination of paths available in a domain for various wavelengths using a wavelength availability of the domain according to various embodiments of the disclosure.

FIG. 4A is a diagram illustrating an original topology of the domain 400. In an embodiment, a domain controller 120 (not shown) of the domain 400 may determine the original topology of the domain 400 using the TEDB 140 (not shown) stored at the domain controller 120. The TEDB 140 may store network topology data received from each of the nodes 115A-G, and the domain controller 120 may use the network topology data to determine the physical topology of the domain 400 shown in FIG. 4A.

Figure 4B:
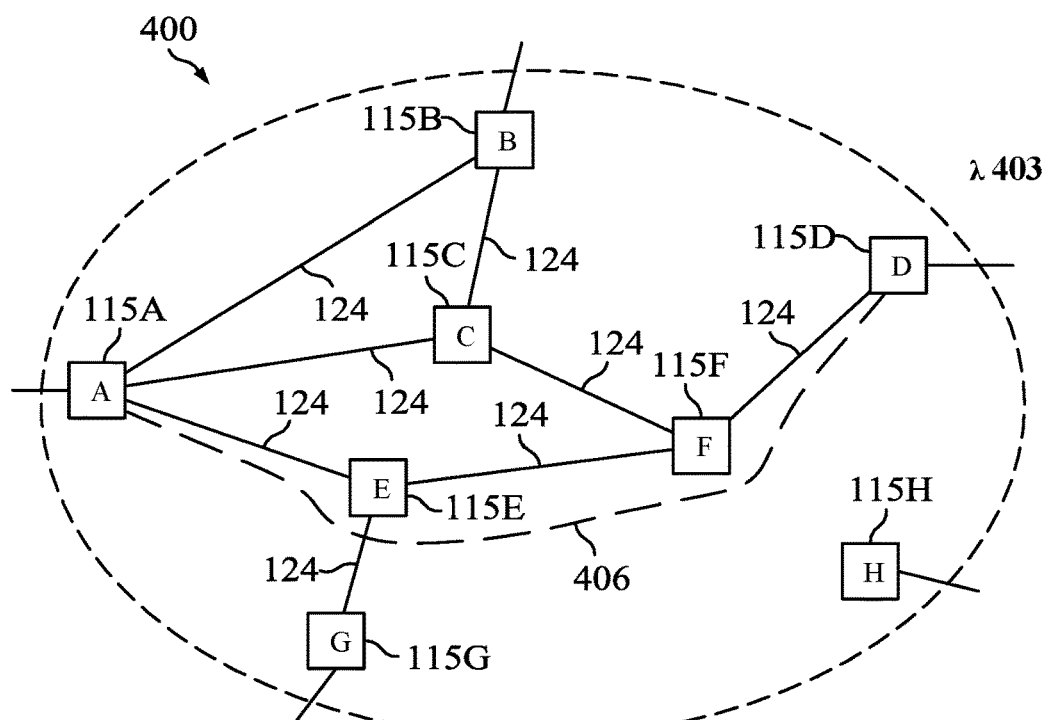

FIG. 4B is a diagram illustrating links 124 with a third wavelength (λ 403) available to transmit data and path 406 that may be used to transmit data between an ingress node 115A and egress node 115D using λ 403. FIG. 4B excludes showing the links 124 between nodes when the link does not have the λ 403 available to transmit data. The ingress node 115A may be a node 115 within the domain 400 that receives data from nodes external to the domain 400 and forwards the data to the intermediary nodes within domain 400. The egress node 115D may be a node 115 within the domain 400 that receives data from the intermediary nodes within domain 400 and forwards the data to another node external to the domain 400. As should be appreciated, the node external to the domain 400 may be a node 115 in another domain (such as domain 103, 106, 109, or 300), a CE 110, a host, a service provider, or any other network device that is external to the domain 400.

As shown in FIG. 4B, the links 124 having λ 403 available to transmit data include the link 124 between node 115A and 115B, the link 124 between node 115A and 115C, the link 124 between node 115A and 115E, the link 124 between node 115B and 115C, the link 124 between node 115E and 115G, the link 124 between node 115C and 115F, the link 124 between node 115E and 115F, and the link 124 between node 115F and 115D.

Therefore, the links 124 between the other nodes 115 in the domain 400 do not have λ 403 available to transmit data. For example, FIG. 4B does not show a link 124 between node 115B and node 115B because the link 124 does not have λ 403 available to transmit data. Similarly, FIG. 4B does not show a link 124 between node 115F and node 115H because the link 124 does not have λ 403 available to transmit data. In this way, FIG. 4B does not show the link 124 between node 115C and node 115D or the link between node 115G and node 115F.

In some embodiments, the domain controller 120 of the domain 400 may be configured to determine at least one path 406 between the ingress node 115A and the egress node 115D in which each of the links 124 on the path have λ 403 available to transmit data. The domain controller 120 may be configured to determine this path 406 based on the links 124 having λ 403 available to transmit data. As shown in FIG. 4B, the path 406 that includes links 124 having λ 403 available includes nodes 115A, 115E, 115F, and 115D. In this way, the path 406 also includes the link 124 between ingress node 115A and node 115E, the link 124 between node 115E and node 115F, and the link 124 between node 115F and the egress node 115D. It should be appreciated that path 406 is just an exemplary, arbitrary, or otherwise selected path selected by the domain controller 120. In this way, the domain controller 120 may select any path with any sequence of nodes and links.

Figure 4C:
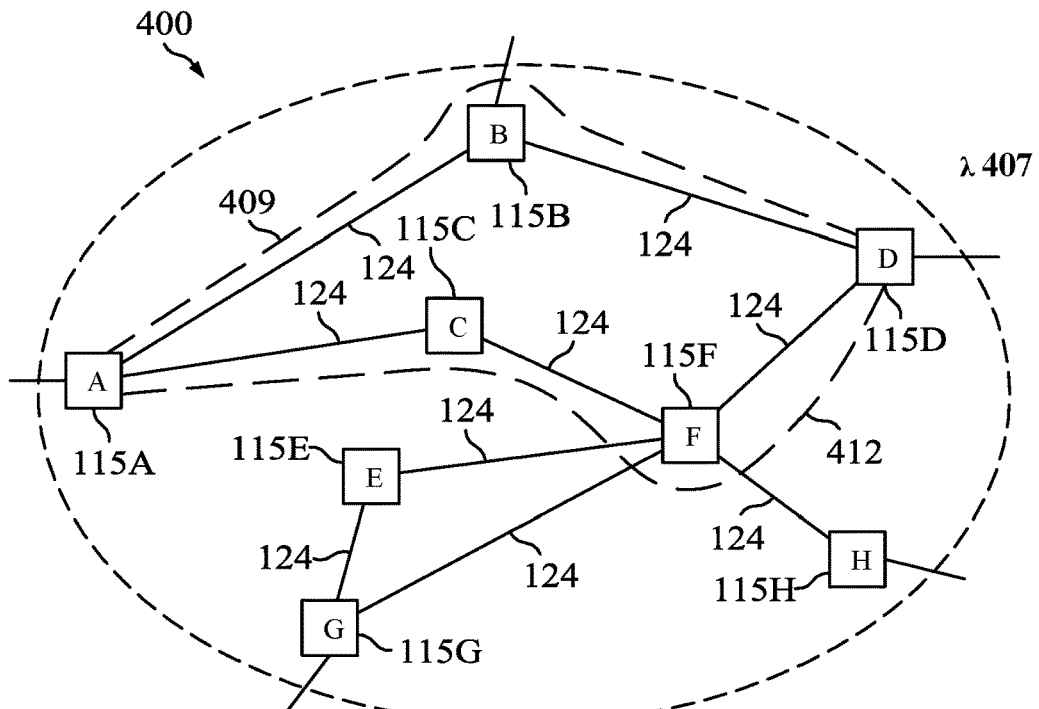

FIG. 4C is a diagram illustrating links 124 with a fourth wavelength (λ 407) available to transmit data and paths 409 and 412 that may be used to transmit data between an ingress node 115A and egress node 115D using λ 407. FIG. 4C excludes showing the links 124 between nodes when the link does not have the λ 407 available to transmit data. As shown in FIG. 4C, the links 124 having λ 407 available to transmit data include the link 124 between ingress node 115A and node 115B, the link 124 between ingress node 115A and node 115C, the link 124 between node 115E and node 115G, the link 124 between node 115B and egress node 115D, the link 124 between node 115C and node 115F, the link 124 between node 115E and node 115F, the link 124 between node 115G and node 115F, the link 124 between node 115F and egress node 115D, and the link 124 between node 115F and node 115H.

Therefore, the links 124 between the other nodes 115 in the domain 400 do not have λ 407 available to transmit data. For example, FIG. 4C does not show a link 124 between node 115A and node 115E because the link 124 does not have λ 407 available to transmit data. Similarly, FIG. 4C does not show a link 124 between node 115C and node 115D because the link 124 does not have λ 407 available to transmit data.

In some embodiments, the domain controller 120 of the domain 400 may be configured to determine at least one path 409 and 412 between the ingress node 115A and the egress node 115D in which each of the links 124 on the path have λ 407 available to transmit data. The domain controller 120 may be configured to determine these paths 409 and 412 based on the links 124 having λ 407 available to transmit data. As shown in FIG. 4C, the path 409 that includes links 124 having λ 407 available includes nodes 115A, 115B, and 115D. In this way, the path 409 also includes the link 124 between ingress node 115A and node 115B, and the link 124 between node 115B and egress node 115D. Similarly, the path 412 that includes links 124 having λ 407 available includes nodes 115A, 115C, 115F, and 115D. In this way, the path 412 also includes the link 124 between ingress node 115A and node 115C, the link 124 between node 115C and node 115F, and the link 124 between node 115F and egress node 115D. As will be further described below with reference to FIGS. 5A-B, the paths 409 and 412 are disjoint such that the paths 409 and 412 do not share any links 124. It should be appreciated that paths 409 and 412 are just an exemplary, arbitrary, or otherwise selected paths selected by the domain controller 120. In this way, the domain controller 120 may select any number of with any sequence of nodes and links so long as the paths are disjoint from one another.

Figure 4D:
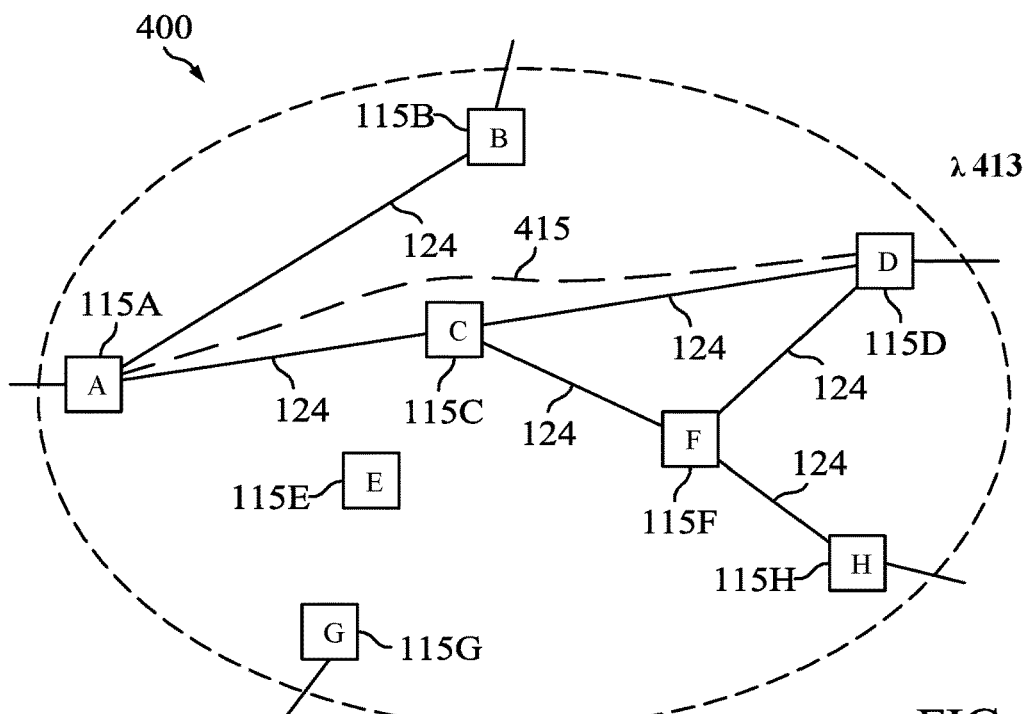

FIG. 4D is a diagram illustrating links 124 with a fifth wavelength (λ 413) available to transmit data and path 415 that may be used to transmit data between an ingress node 115A and egress node 115D using λ 413. FIG. 4D excludes showing the links 124 between nodes when the link does not have the λ 413 available to transmit data. As shown in FIG. 4D, the links 124 having λ 413 available to transmit data include the link 124 between ingress node 115A and node 115B, the link 124 between ingress node 115A and node 115C, the link 124 between node 115C and node 115D, the link 124 between node 115C and egress node 115F, the link 124 between node 115F and egress node 115D, and the link 124 between node 115F and node 115H.

Therefore, the links 124 between the other nodes 115 in the domain 400 do not have λ 413 available to transmit data. For example, FIG. 4D does not show a link 124 between node 115A and node 115E, a link 124 between node 115E and node 115G, a link 124 between node 115C and node 115E, a link 124 between node 115B and node 115C, or a link 124 between node 115B and node 115D. This is because in network 400, these links do not have λ 413 available to transmit data.

In some embodiments, the domain controller 120 of the domain 400 may be configured to determine at least one path 415 between the ingress node 115A and the egress node 115D in which each of the links 124 on the path have λ 413 available to transmit data. The domain controller 120 may be configured to determine this path based on the links 124 having λ 413 available to transmit data. As shown in FIG. 4D, the path 415 that includes links 124 having λ 413 available includes nodes 115A, 115C, and 115D. In this way, the path 415 also includes the link 124 between ingress node 115A and node 115C, and the link 124 between node 115C and egress node 115D. It should be appreciated that path 415 is just an exemplary, arbitrary, or otherwise selected path selected by the domain controller 120. In this way, the domain controller 120 may select any path with any sequence of nodes and links.

Figure 5A:
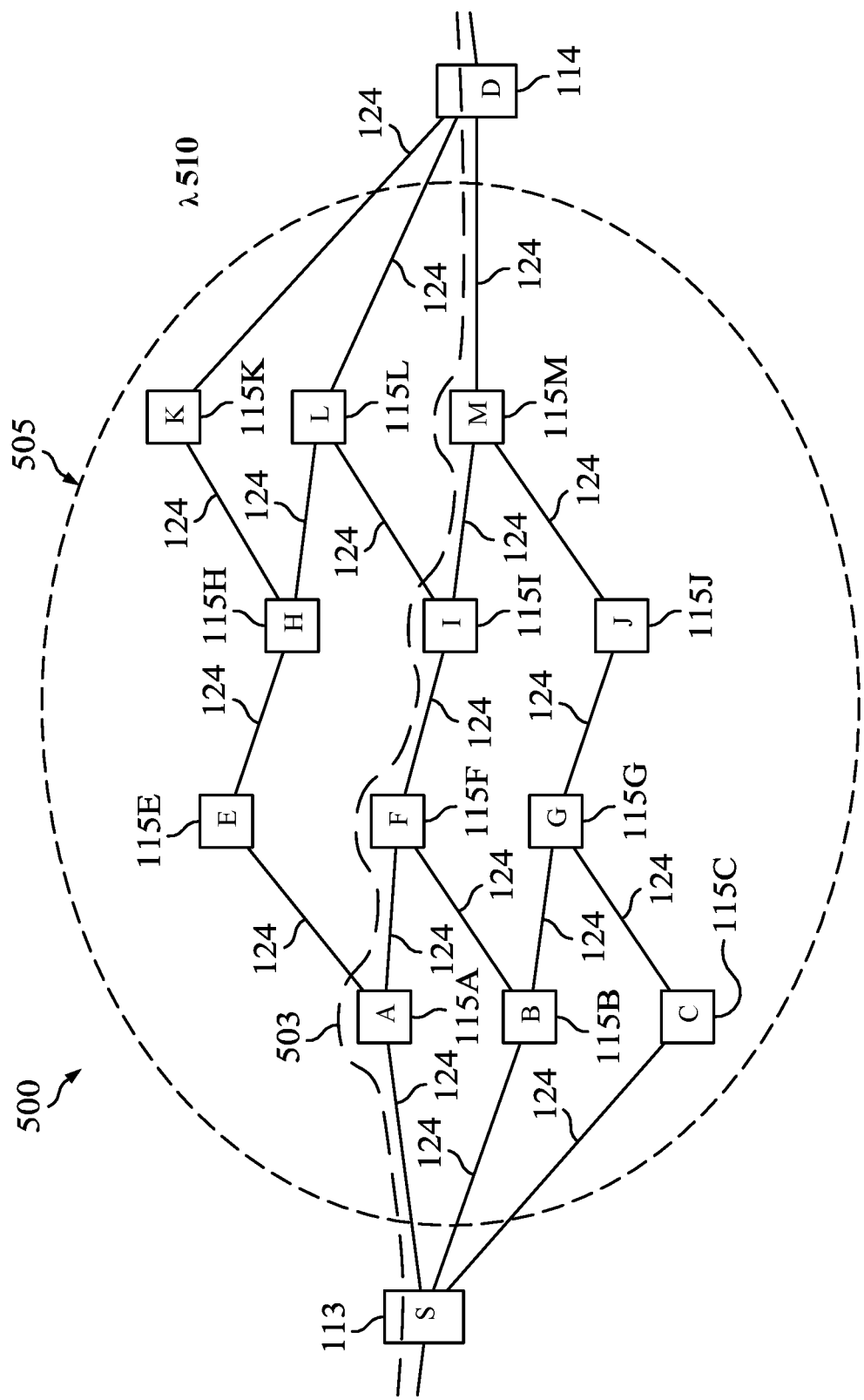
FIGS. 5A and 5B are diagrams illustrating various types of paths that may be determined in a network having a domain.
Figure 5B:
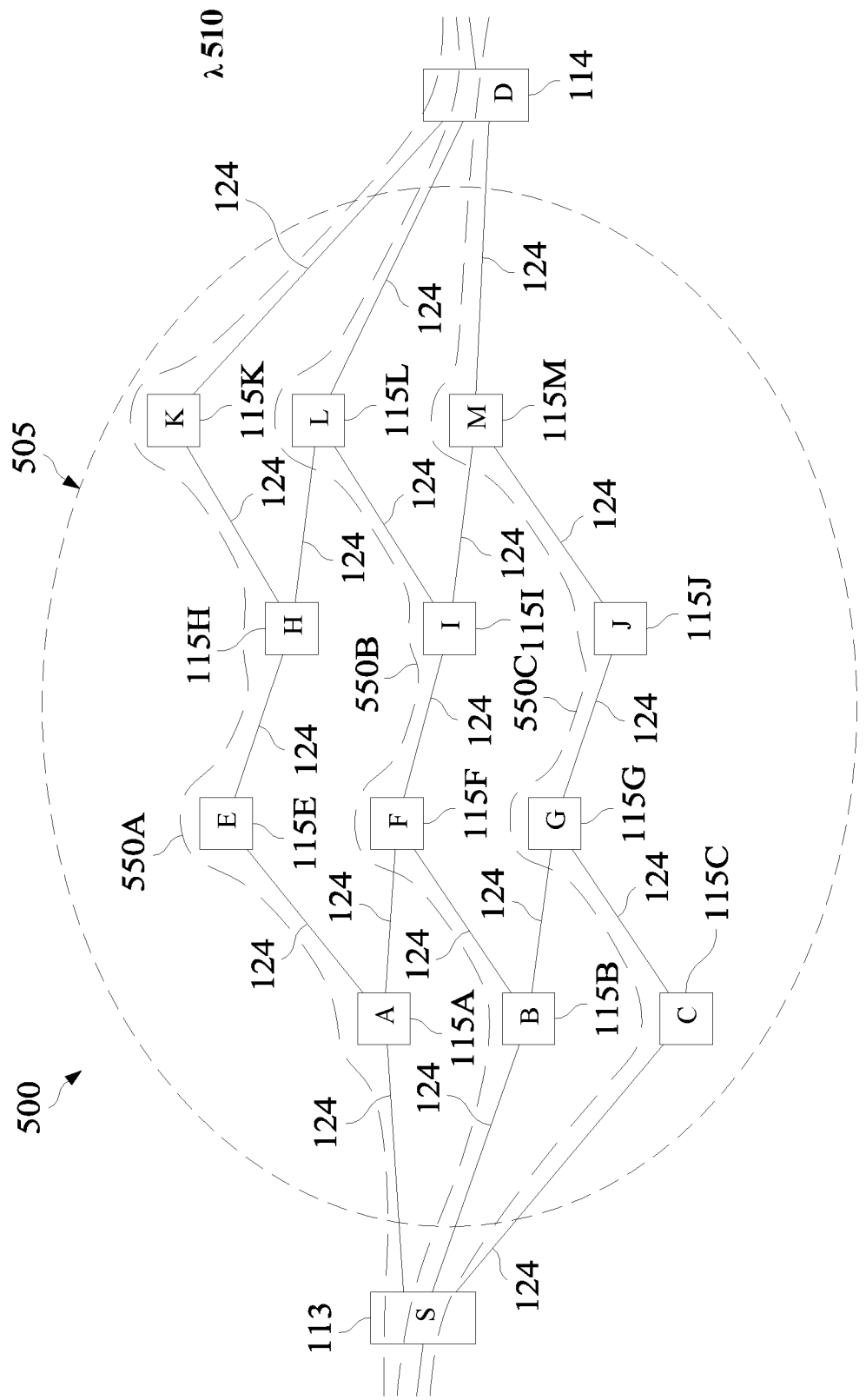

FIGS. 5A and 5B are diagrams illustrating various types of paths that may be determined in a network 500 having a domain 505. The network 500 may be similar to the network 100, and the domain 505 may be similar to domain 103, 106, 109, 300, and 400. As shown in FIGS. 5A and 5B, network 500 includes a source 113, a destination 114, and the domain 500. The domain 500 may include nodes 115A-M interconnected by links 124. The links 124 shown in FIGS. 5A and 5B are only the links 124 having a certain wavelength (λ 510) available by which to transmit data. That is, FIGS. 5A and 5B do not show all the physical links 124 within the domain 500, but only show the links 124 in the domain 500 that have λ 510 available to transmit data. The source 113 may be located outside the domain 500, and the destination 114 may be location outside the domain 500. For example, a CE 110 may be positioned in between the source 113 and the domain 500 or another domain 103, 106, 109, 300, or 400. Similarly, a CE 110 may be positioned in between the destination 114 and the domain 500 or another domain 103, 106, 109, 300, or 400.

FIG. 5A is a diagram illustrating the network 500 comprising the domain 505, where a single shortest path 503 is determined between the source 113 and the destination 114. In some embodiments, each of the links 124 on the shortest path 503 may have the λ 510 available to transport traffic. In an embodiment, the shortest path 503 may be a path between the source 113 and the destination 114 having the least latency on each link 124 between the nodes 115 on the shortest path 503. In some embodiments, the domain controller 120 (not shown) of the domain 500 may determine the single shortest path 503 from the source 113 to the destination 114. This is determined based on user defined criterion and a corresponding network constraint. For example, if the source 113 requests a shortest path 503 to the destination 114 having the least latency (user criterion), then the domain controller 120 may analyze the TEDB 140 (not shown) to identify a shortest path between the source 113 and the destination 114 with links 124 having the least latency (network constraint).

In the example shown in FIG. 5A, the shortest path 503 between the source 113 and the destination 114 includes the ingress node 115A, node 115F, node 115I, node 115M, and egress node 115D. In this way, the shortest path 503 also includes the link 124 between the source 113 and the ingress node 115A, the link 124 between node 115A and node 115F, the link between node 115F and node 115I, the link 124 between node 115I and node 115M, and the link between node 115M and node 115D. In the example shown in FIG. 5A, the domain controller 120 may be configured to identify a shortest path 503 having a least latency according to a customer specified criterion in which a customer behind the source 113 requests a path with the least latency. However, the domain controller 120 may identify other types of viable paths based on other customer specified criterion and network constraints, such as maximizing throughput.

FIG. 5B is a diagram illustrating the network 500 comprising the domain 505, where multiple parallel paths 550A-C are determined between the source 113 and the destination 114. In some embodiments, each of the links 124 on the parallel paths 550A-C may have the λ 510 available to transport traffic. In the example shown in FIG. 5B, the first parallel path 550A includes the ingress node 115A, node 115E, node 115H, node 115K, and egress node 115D. In this way, the first parallel path 550A also includes the link 124 between the source 113 and ingress node 115A, the link 124 between ingress node 115A and node 115E, the link 124 between node 115E and node 115H, the link 124 between node 115H and node 115K, and the link 124 between node 115K and egress node 115D. The second parallel path 550B includes the ingress node 115B, node 115F, node 115I, node 115L, and egress node 115D. In this way, the second parallel path 550B also includes the link 124 between the source 113 and ingress node 115B, the link 124 between ingress node 115B and node 115F, the link 124 between node 115F and node 115I, the link 124 between node 115I and node 115L, and the link 124 between node 115L and egress node 115D. The third parallel path 550C includes the ingress node 115C, node 115G, node 115J, node 115M, and egress node 115D. In this way, the third parallel path 550C also includes the link 124 between the source 113 and ingress node 115C, the link 124 between ingress node 115C and node 115G, the link 124 between node 115G and node 115J, the link 124 between node 115J and node 115M, and the link 124 between node 115M and egress node 115D.

In some embodiments, each of the parallel paths 550A-C are disjoint from one another such that no two parallel paths 550A-C share any of the same links 124. For example, each of the parallel paths 550A-C include different links 124 connecting different nodes 115 within the domain 500. Since each of the parallel paths 550A-C have the λ 510 available to transport data, each of the disjoint and parallel paths 550A-C may be provisioned separately but simultaneously, if the parallel paths are free of optical impairments, to transmit the most amount of data and thereby maximize throughput for transportation of data between the source 113 and the destination 114. In some embodiments, the domain controller 120 (not shown) of the domain 500 may determine the parallel paths 550A-C between the source 113 to the destination 114 based the total throughput that may be available on the parallel paths 550A-C having λ 510 available.

Figure 6A:
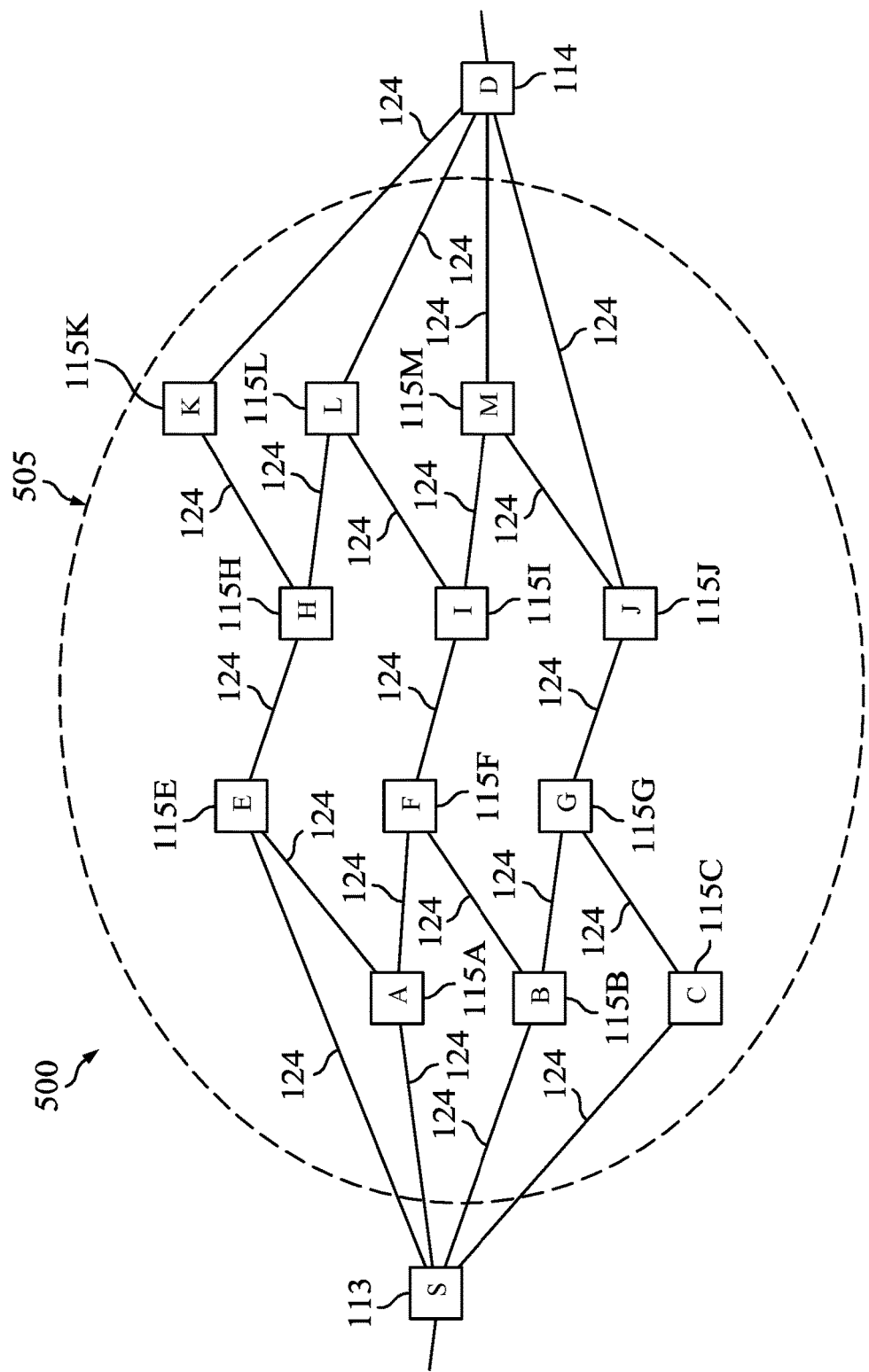
FIGS. 6A-E are diagrams illustrating a method of path estimation by determining viable paths and sets of parallel paths having a wavelength ($\lambda$) available within the domain of a network according to various embodiments of the disclosure.

FIGS. 6A-E are diagrams illustrating a method of path estimation by determining viable paths and sets of parallel paths having a λ 510 available within the domain 505 of network 500 according to various embodiments of the disclosure. FIG. 6A is a diagram illustrating a physical topology of the network 500 comprising the source 113, destination 114, and domain 505. The diagram shown in FIG. 6A is similar to the domain 500 shown in FIG. 5A, except that the diagram shown in FIG. 6A shows the actual physical links 124 without reference to a specific wavelength. Therefore, the physical links 124 shown in FIG. 6A may have zero or more wavelengths available by which to transport data. In some embodiments, a domain controller 120 (not shown) of the domain 505 may first be configured to determine an abstraction of the physical topology of the domain 505 as shown in FIG. 6A.

Figure 6B:
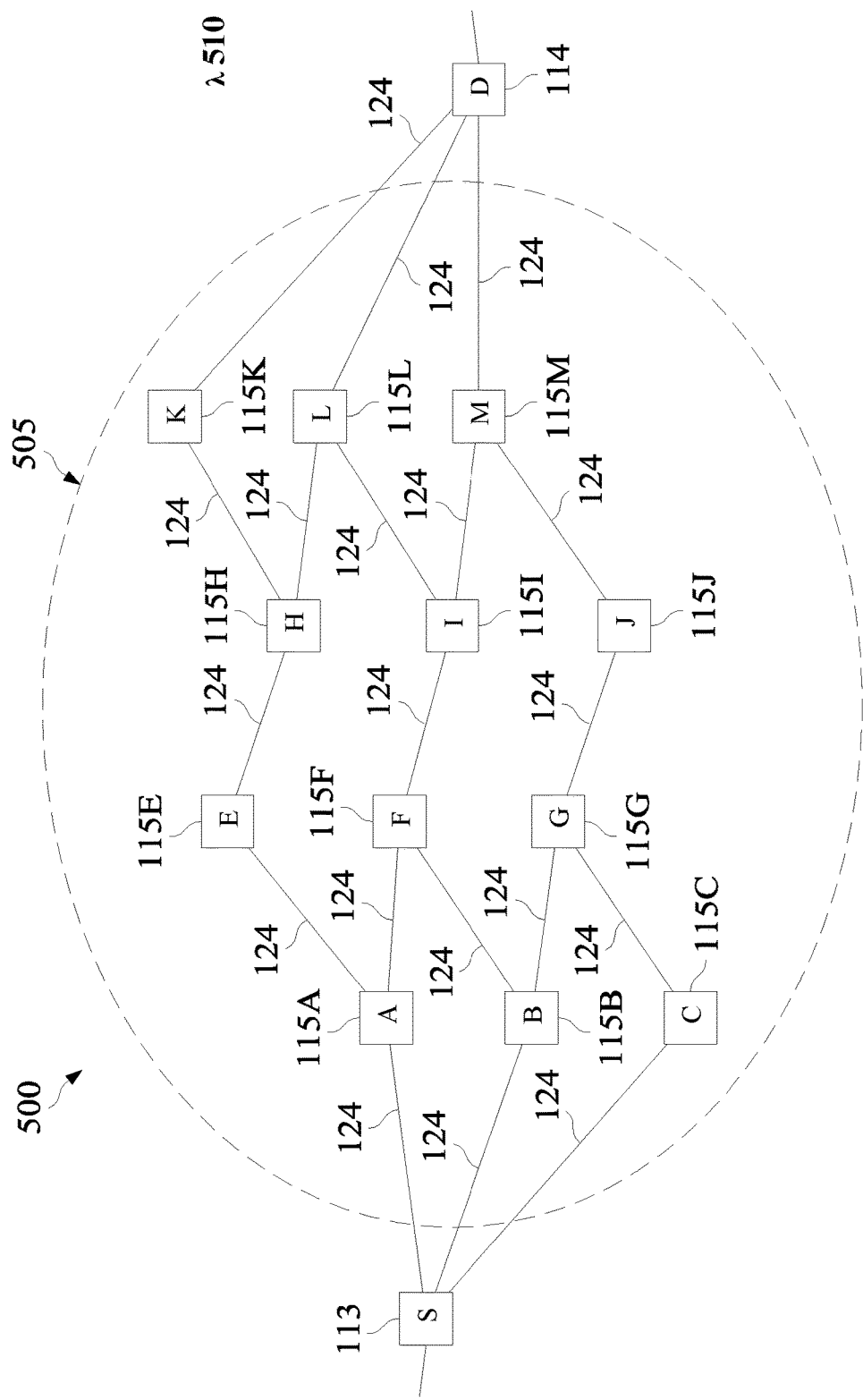

FIG. 6B is a diagram illustrating wavelength availability for λ 510 according to various embodiments of the disclosure. The diagram shown in FIG. 6B is similar to the diagram shown in FIG. 5A, except that FIG. 6B does not identify a shortest path 503. Instead, the diagram shown in FIG. 6B shows the links 124 in the domain 505 that have λ 510 available to transport data. In some embodiments, a domain controller 120 of domain 505 may be configured to determine the wavelength for each and every wavelength that may be available on the links 124 within domain 505, including λ 510. Therefore, while FIGS. 6A-E only address λ 510, it should be appreciated that the same methods may be used for any other wavelength that is available on any of the links 124 within a domain 505.

Figure 6C:
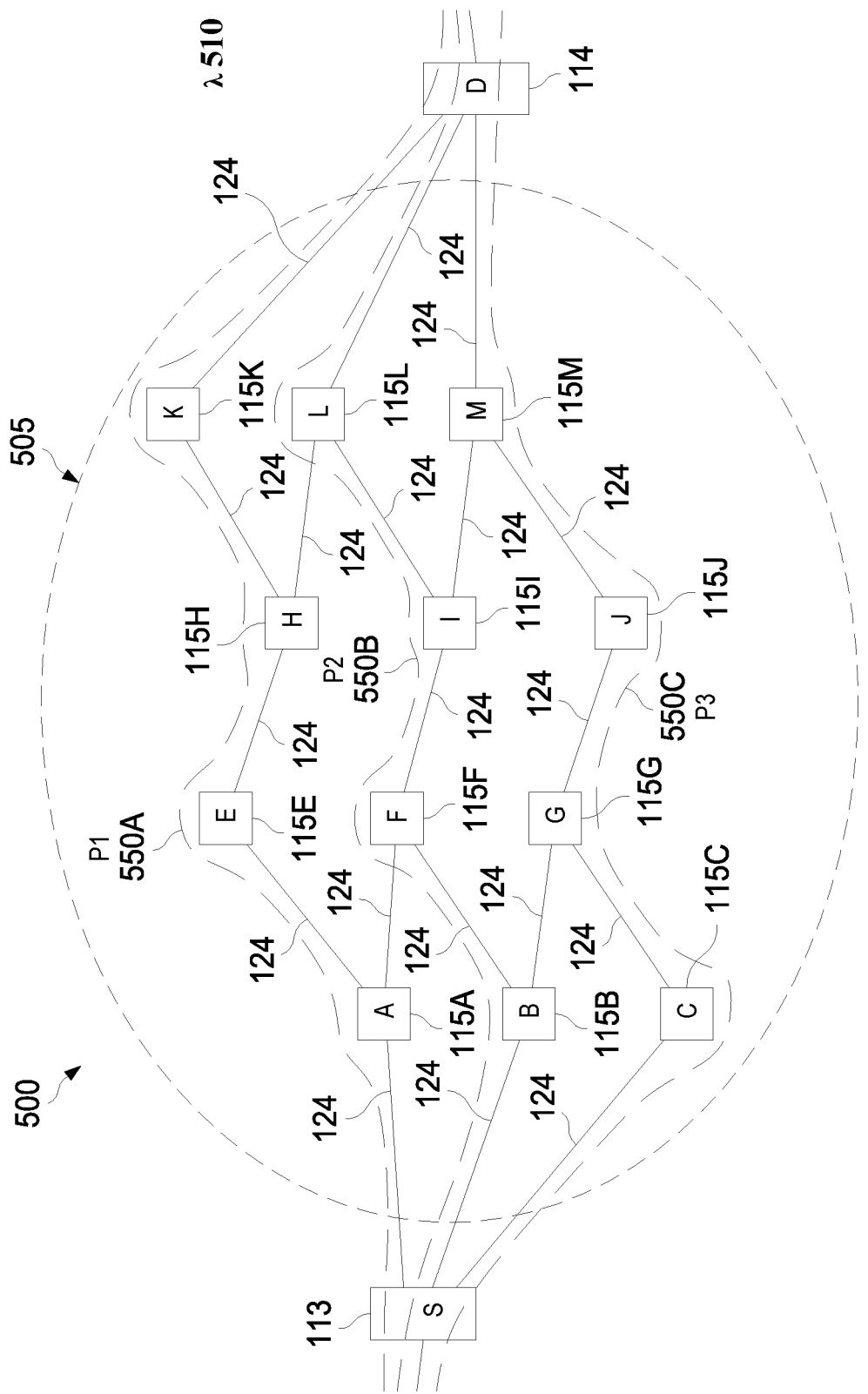

FIG. 6C is a diagram illustrating a first set of parallel paths 550A-C identified within the domain 505 for the λ 510. The diagram shown in FIG. 6C is similar to the diagram shown in FIG. 5B including the parallel paths 550A-C. As described above with reference to FIG. 5B, the parallel paths 550A-C are each disjoint in that each of the parallel paths 550A-C have different links 124 and thus, do not share any of the same links 124. In an embodiment, the domain controller 120 is configured to determine the first set of parallel paths 550A-C within the domain 505 for the λ 510. In some embodiments, the domain controller 120 is configured to determine other sets of parallel paths for the same λ 510, as will be further described below with reference to FIGS. 6D-E.

After determining the first set of parallel paths 550A-C, the domain controller 120 may be configured to determine which of the parallel paths 550A-C are viable paths. In an embodiment, a viable path refers to a path that is free of optical impairments such that no node 115 or link 124 on the path is optically impaired. In an embodiment, an optical impairment refers to a failure or poor condition level of a node 115 and/or link 124 on a path. In some embodiments, each node 115 may send optical impairment data to the domain controller 120. The optical impairment data may include an OSNR of each link 124 and/or node 115, a CD of each link 124 and/or node 115, a PMD of each link 124 and/or node 115, a PDL of each link 124 and/or node 115, and a power level of each link 124 and/or node 115. In some embodiments, the domain controller 120 may determine whether the optical impairment data for each node 115 and link 124 on the parallel paths renders one of the nodes 115 or links 124 on the path as being optically impaired.

For example, the domain controller 120 may store various threshold levels for each of the different types of optical impairment data. In an embodiment, when a certain type of optical impairment data for a given node 115 or link 124 falls below or, in some cases, falls higher than the threshold level, then the node 115 or link 124 is deemed to be optically impaired. In this way, the domain controller 120 may be configured to determine whether each node 115 and/or link 124 on each of the paths in the first set of parallel paths 115A-C is optically impaired. The domain controller 120 may determine that one of the parallel paths 115A-C is a viable path based on whether any of the nodes 115 or links 124 are optically impaired.

In the example shown in FIG. 5B, suppose that all of the nodes 115 in the parallel path 550A and all of the links 124 in the parallel path 550A are free of optical impairments (i.e., there are no optical impairments present on the parallel path 550), then the parallel path 550A is deemed a viable path. However, suppose that one of the links 124 on the parallel path 550B is deemed optically impaired because, for example, a power level of the link 124 is below the threshold level. In this case, the parallel path 550B is not deemed a viable path because the link 124 on the parallel path 550B is deemed optically impaired. Similarly, suppose that one of the nodes 115 on the parallel path 550C is deemed optically impaired because, for example, an OSNR of the node 115 is higher than a threshold level. In this case, the parallel path 550C is not deemed a viable path because the node 115 on the parallel path 550C is deemed optically impaired.

In some embodiments, the domain controller 120 may be configured to determine that the viable path set for all paths between the source 113 and the destination 114 having the λ 510 available to transport data consists of parallel path 550A. In some embodiments, the domain controller 120 may be configured to determine that the parallel path set having the greatest number of viable paths is parallel path 550A because no other parallel path sets have been determined yet. In some embodiments, the domain controller 120 may continue to identify other sets of parallel paths for the λ 510.

Figure 6D:
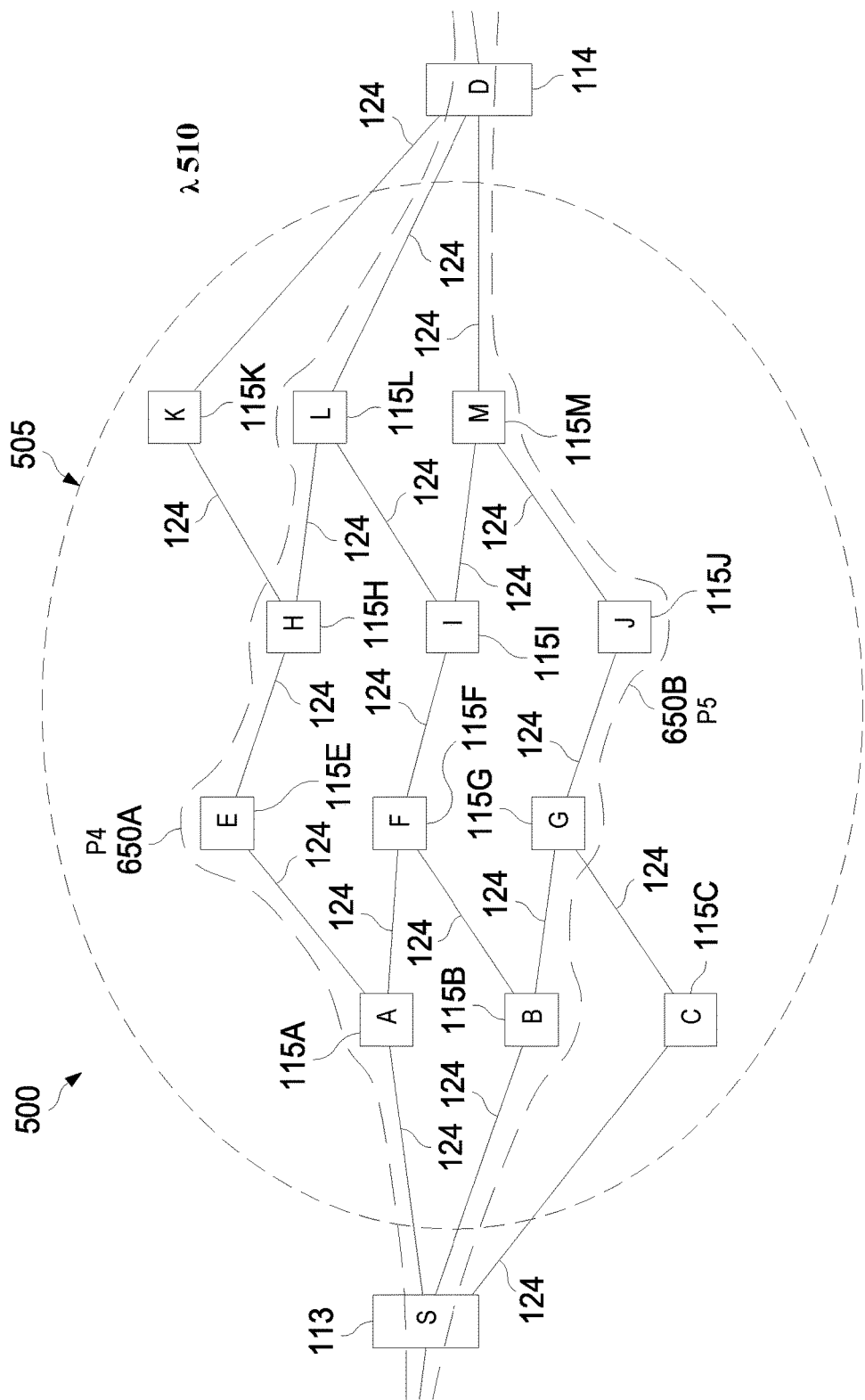

FIG. 6D is a diagram illustrating a second set of parallel paths 650A-B identified within the domain 505 for the λ 510. The second set of parallel paths 650A-B includes two parallel paths 650A and 650B, where each parallel path is disjoint and does not share any common links. For example, the first parallel path 650A includes ingress node 115A, node 115E, node 115H, node 115L, and egress node 115D. In this way, the first parallel path 650A also includes the link 124 connecting the source 113 to the ingress node 115A, the link 124 connecting the ingress node 115A to node 115E, the link 124 connecting node 115E to node 115H, the link 124 connecting node 115H and node 115L, the link 124 connecting node 115L and egress node 115D. Similarly, the second parallel path 650B includes ingress node 115B, node 115G, node 115J, node 115M, and egress node 115D. In this way, the second parallel path 650B also includes the link 124 connecting the source 113 to the ingress node 115B, the link 124 connecting the ingress node 115B to node 115G, the link 124 connecting node 115G to node 115J, the link 124 connecting node 115J and node 115M, the link 124 connecting node 115M and egress node 115D. All of the links 124 in the first parallel path 650A are different from all of the links 124 in the second parallel path 650B. Therefore, the first parallel path 650A and the second parallel path 650B are parallel and disjoint from one another.

In some embodiments, the domain controller 120 may be configured to determine which of the paths in the second set of parallel paths 650A-B are viable paths and then aggregate these viable paths with the viable paths determined from FIGS. 6B and 6C. In this way, the set of viable paths comprise all viable paths determined for a specified wavelength. Suppose that both the first parallel path 650A and the second parallel path 650B are free from any optical impairments (i.e., none of the nodes 115 or links 124 on both of the first parallel path 650A and the second parallel path 650B is optically impaired), then both first parallel path 650A and the second parallel path 650B are deemed viable paths. In this case, the domain controller 120 may be configured to determine that the viable path set for all paths between the source 113 and the destination 114 having the λ 510 available to transport data consists of parallel path 550A, parallel path 650A, and parallel path 650B. In this case, the domain controller 120 may be configured to determine that the parallel path set having the greatest number of viable paths, and thus the maximum throughput, is the parallel path set including parallel path 650A, parallel path 650B. In this way, the set of parallel paths may only include one set of parallel and disjoint paths, such as, for example, the set of second parallel paths 650A-B.

Figure 6E:
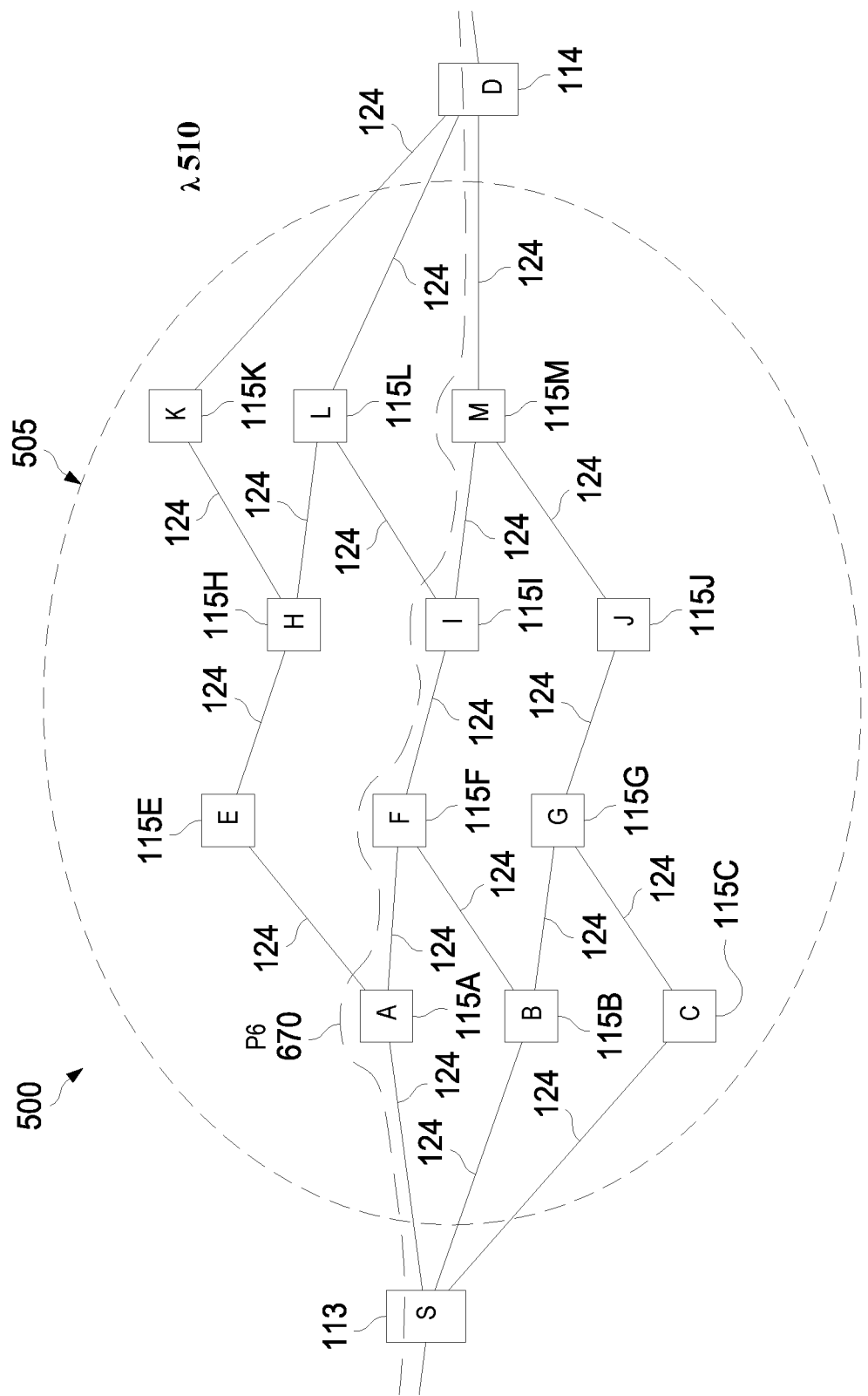

FIG. 6E is a diagram illustrating a third set of parallel paths 670 identified within the domain 505 for the λ 510. The third set of parallel paths 670 may only include one path 670. The path 670 may be the shortest path from the source 113 to the destination 114 based on a network constraint such as, for example, latency. The path 670 may include ingress node 115A, node 115F, node 115I, node 115M, and egress node 115D. In this way, the path 670 also includes the link 124 from the source 113 to the ingress node 115A, the link 124 from the ingress node 115A to the node 115F, the link 124 from the node 115F to the node 115I, the link 124 from the node 115I to the node 115M, and the link 124 from the node 115M to the egress node 115D.

In some embodiments, the domain controller 120 may be configured to determine whether path 670 is a viable path. Suppose that each of the nodes 115 and links 124 on the path 670 is free of optical impairments. In this case, the path 670 is deemed a viable path. In some embodiments, the set of viable paths may be aggregated to include all the viable paths determined by the domain controller 120 for a specified wavelength. For example, the set of viable paths may include all the viable paths determine from FIGS. 6B-D. The domain controller 120 may be configured to determine that the viable path set for all paths between the source 113 and the destination 114 having the λ 510 available to transport data consists of parallel path 550A, parallel path 650A, parallel path 650B, and path 670. Since path 670 is a single shortest path, the path 670 does not have any other parallel paths that may be used to maximize throughput. In this case, the domain controller 120 may be configured to determine that the parallel path set having the greatest number of viable paths is still parallel path 650A and parallel path 650B}.

In some embodiments, the domain controller 120 may be configured to send information regarding both the viable path set and the parallel path set to the super controller 112. In some embodiments, the super controller 112 may use the viable path set and the parallel path set to determine the best path for a customer based on a criterion specified by the customer. For example, the criterion specified by the customer may be a maximum bandwidth, also referred to herein as maximum throughput. In this case, the super controller 112 may identify each of the parallel paths in the parallel path set as being the paths to provision for the customer. For example, suppose that the criterion specified by the customer may be for a least latency path. In this case, the super controller 112 may identify that the path 670 having the shortest path may be the path that should be provisioned for the customer. As will be further described below, once the super controller 112 identifies a path that should be provisioned for the customer based on the set of viable paths and parallel paths, the super controller 112 transmits an identification of the selected path to the domain controller 120. In some embodiments, the domain controller 120 and the super controller 112 will work together to verify that the selected path is still free of optical impairments, and continue to select a different path until one that is free of optical impairments is selected.

Figure 7:
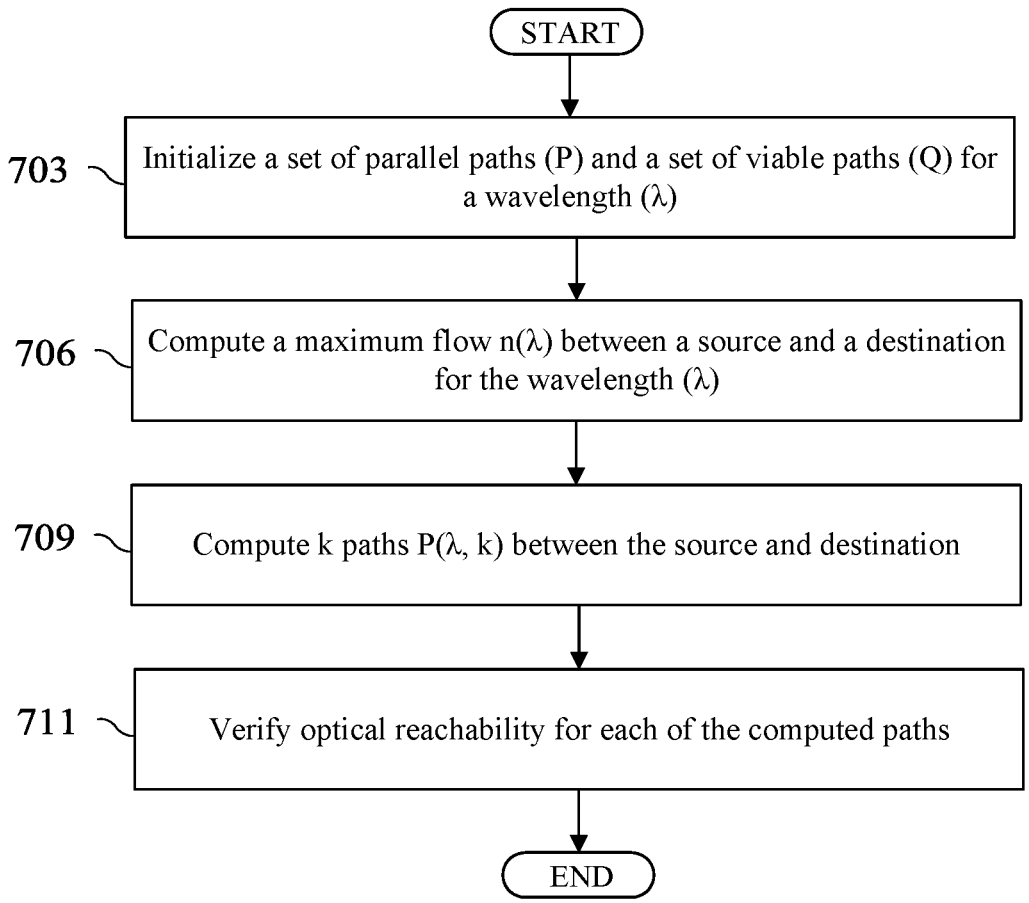
FIG. 7 is a flowchart illustrating a method for performing path estimation within a domain according to various embodiments of the disclosure.

FIG. 7 is a flowchart illustrating a method 700 for performing path estimation within a domain according to various embodiments of the disclosure. The method 700 may be similar to method shown in FIGS. 6A-E. In an embodiment, method 700 may be performed by a domain controller 120 within a domain 103, 106, 109, 300, 400, or 505. In an embodiment, method 700 may be performed by a domain controller 120 when the domain controller 120 begins determining viable paths and parallel paths in a domain. At step 703, a set of parallel paths (P) and a set of viable paths (Q) are each initialized to 0. The set of viable paths (Q) may be all paths between the source 113 and the destination 114 having a certain wavelength available to transport data, as described above in FIG. 6A-E. The set of parallel paths (P) may be the parallel path set having the greatest number of viable paths, as described above in FIG. 6A-E. In some embodiments, the set of parallel paths (P) and set of viable paths (Q) may be initialized for all the different wavelengths available with the domain such that method 700 may be looped through and repeated for each of the wavelengths available in the domain. In an embodiment, the path module 255 may be executed by the processor 205 to initialize the set of parallel paths (P) and set of viable paths (Q).

At step 706, a maximum flow $n(\lambda)$ is computed between the source 113 and destination 114 for the wavelength. The maximum flow $n(\lambda)$ may refer to a maximum bandwidth or maximum throughput that may be used to transport data across a set of parallel paths for a given wavelength. For example, the maximum flow $n(\lambda)$ for the example described in FIGS. 6A-E may be provided by the parallel path set parallel path 650A and parallel path 650B if the bandwidth total that is available in both parallel path 650A and parallel path 650B is greater than any other shortest path or other parallel path set for that wavelength. In some embodiments, the maximum flow $n(\lambda)$ may be based on the bandwidth available at each link 124 in the domain that has the wavelength available to transport data. In an embodiment, the path module 255 may be executed by the processor 205 to compute the maximum flow $n(\lambda)$ between the source 113 and destination 114 for the wavelength.

At step 709, k parallel paths are computed between a source 113 and destination 114. For example, if the maximum flow $n(\lambda)>0$, then for each $k=n(\lambda), \ldots 1$, descending, the k paths $(P(\lambda, k))$ are computed between the source 113 and the destination 114 for each wavelength. In some embodiments, propagation delay or latency may be used as weights on each of the links 124 to determine the k paths for each wavelength. For example, the path module 255 may be configured to compute the k paths between a source 113 and destination 114 for each wavelength available.

At step 711, an optical reachability for each of the computed paths is verified. The optical reachability may refer to whether a path includes a node 115 or link 124 with an optical impairment. For example, a path is verified to be optically reachable when the path does not include a node 115 or link 124 with an optical impairment. A path may be verified as not optically reachable when the path includes a node 115 or link 124 with an optical impairment. In some embodiments, the domain controller 120 may add any of the computed paths $P(\lambda, k)$ to the set of viable paths (Q) when the path is optically reachable. When all of the paths in a set of parallel paths $P(\lambda, k)$ are reachable, then the parallel paths $P(\lambda, k)$ is the first set of parallel paths for the wavelength, and $P=P+P(\lambda, k)$. For example, the path module 255 may be configured to verify the optical reachability for each of the computed paths.

In some embodiments, the domain controller 120 may return the number of paths in the set of parallel paths (P). In some embodiments, the maximum bandwidth may be the number of paths in the set of parallel paths (P), and the maximum bandwidth may be returned. In some embodiments, the propagation delay on each of the paths in the set of parallel paths (P) may also be returned.

Figure 8:
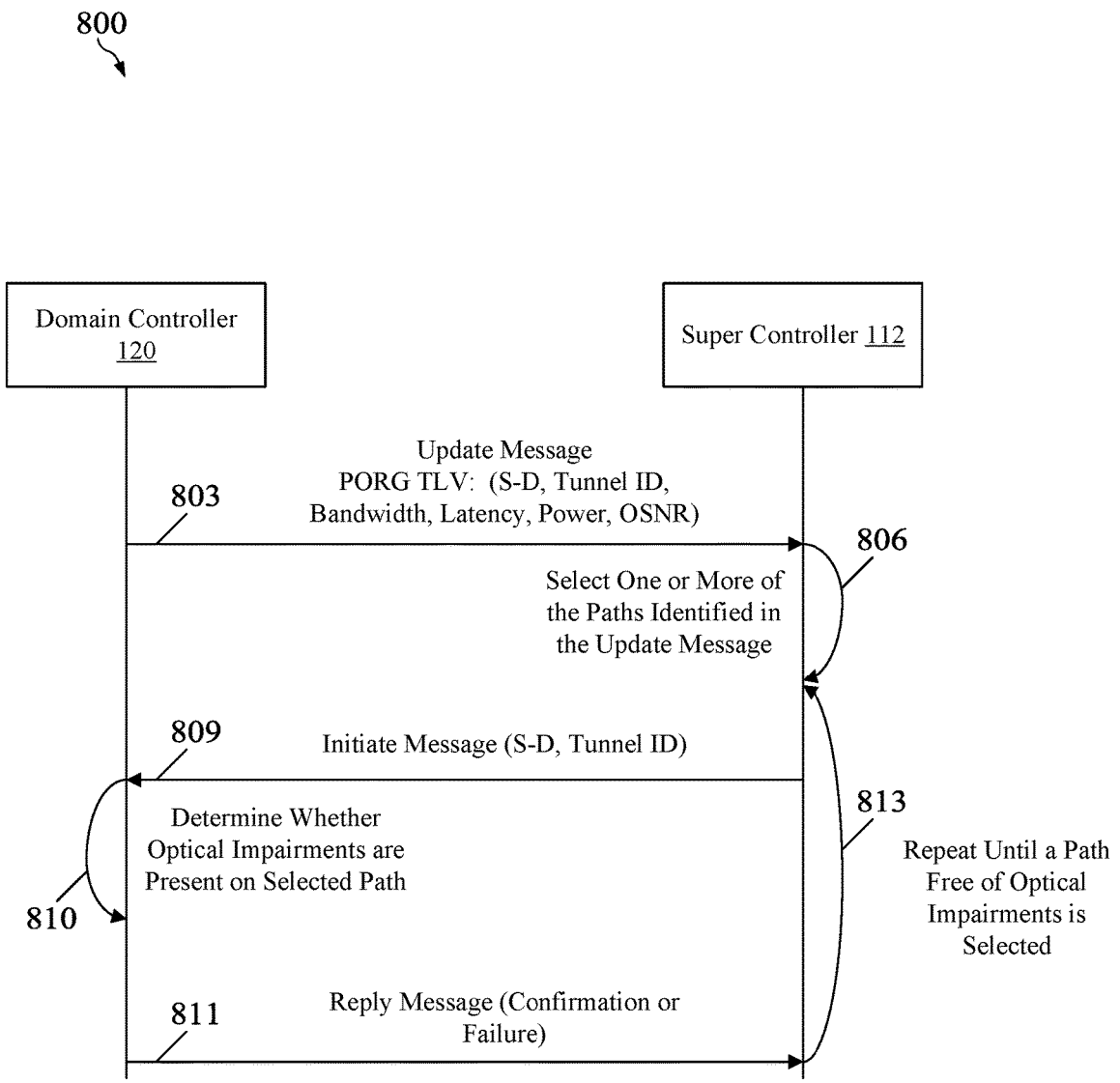
FIG. 8 is a message sequence diagram showing a sequence of messages exchanged between the super controller and the domain controller while performing path estimation and path propagation according to the embodiments disclosed herein.

FIG. 8 is a message sequence diagram 800 showing a sequence of messages exchanged between the super controller 112 and the domain controller 120 while performing path estimation and path propagation according to the embodiments disclosed herein. In some embodiments, the message sequence diagram 800 may be implemented after the domain controller 120 has determined the set of viable paths and the set of parallel paths, as described above with reference to FIGS. 6A-E and method 700.

At step 803, the domain controller 120 transmits an update message to the super controller 112. The update message may comprise optical impairment data for each of the paths determined in the set of viable paths and the set of parallel paths. In one embodiment, the optical impairment data may also be referred to as a partial optical reachability graph. In some embodiments, the update message may comprise an identifier of the source 113 and an identifier of the destination 114. In some embodiments, the update message may comprise an identifier of a path and the optical impairment data associated with the path, such as, for example, a bandwidth of the path, a latency of the path, a power of the path, BER of the path, Q-factor of the path, and/or an OSNR of the path. In some embodiments, the update message may comprise an identifier and optical impairment data for each of the paths defined by the set of viable paths and the set of parallel paths for a single wavelength. In some embodiments, the update message may comprise the identifiers and optical impairment data for each of the paths identified for each of the wavelengths available in a domain. In some embodiments, the update message may comprise this information for all of the various pairs of sources 113 and destinations 114 that may be available by the domain. Additional details of the update message will be described below with reference to FIG. 9. In some embodiments, the information received in the update message is stored at the super controller 112.

At step 806, the super controller 112 may select one or more of the paths identified in the update message. For example, the super controller 112 receives the set of viable paths and the set of parallel paths from the domain controller 120 and determines whether to select a path based on a network constraint. The network constraint may be, for example, minimizing latency or maximizing throughput. Based on the network constraint, the super controller 112 may determine that a shortest path with the least latency should be selected or that a set of parallel paths with the maximum throughput should be selected.

At step 809, the super controller 112 may transmit an initiate message to the domain controller 120. The initiate message may comprise an identifier of the source 113, and identifier of the destination 114, and an identifier of the one or more paths selected by the super controller 112 that satisfies the network constraint. In some embodiments, each of the paths included in the set of viable paths and the set of parallel paths are free of optical impairments when the information regarding the set of viable paths and the set of parallel paths is sent to the super controller 112. However, the condition of each of the links 124 and/or nodes 115 on the selected paths may have changed between the time the update message was sent at step 803 and the initiate message was received at step 809.

According to some embodiments, the domain controller 120 is configured to verify the optical reachability of the selected one or more paths to ensure that the selected path is not optically impaired. At step 810, the domain controller 120 may determine whether optical impairments are present or have occurred on the selected paths. The determination of whether optical impairments are present or have occurred on the path is performed in a manner similar to that which is described in FIGS. 6A-E. For example, the domain controller 120 may use the information stored at TEDB 140 to determine whether any of the links 124 and/or nodes 115 of the selected paths are optically impaired.

At step 811, the domain controller 120 transmits a reply message to the super controller 112 indicating whether the selected one or more paths are free of optical impairments (confirmation) or are optically impaired (failure). When the reply message indicates that the domain controller 120 determined that the selected one or more paths are free of optical impairments, then the super controller 112 may store the success of the path, and the domain controller 120 may begin provisioning the selected one or more paths.

At step 813, when the reply message indicates that the domain controller 120 determined that the selected one or more paths are optically impaired, the super controller 112 updates the stored optical impairment data to reflect the failure of the path. In some embodiments, the super controller 112 may then select another path based on the information received in the update message and the network constraint specified by the customer. After the super controller 112 selects another path, steps 809-811 repeat until the reply message indicates that the domain controller 120 determined that the selected one or more paths are free of optical impairments.

According to some embodiments, the domain controller 120 is configured to transmit information describing parallel path sets and viable paths that are free of optical impairments for multiple different wavelengths to the super controller 112. The super controller 112 may then use this information to best select a path or a set of parallel paths for a customer. The domain controller 120 may also verify that the selected paths are still free of optical impairments before provisioning the path for the customer.

Figure 9:
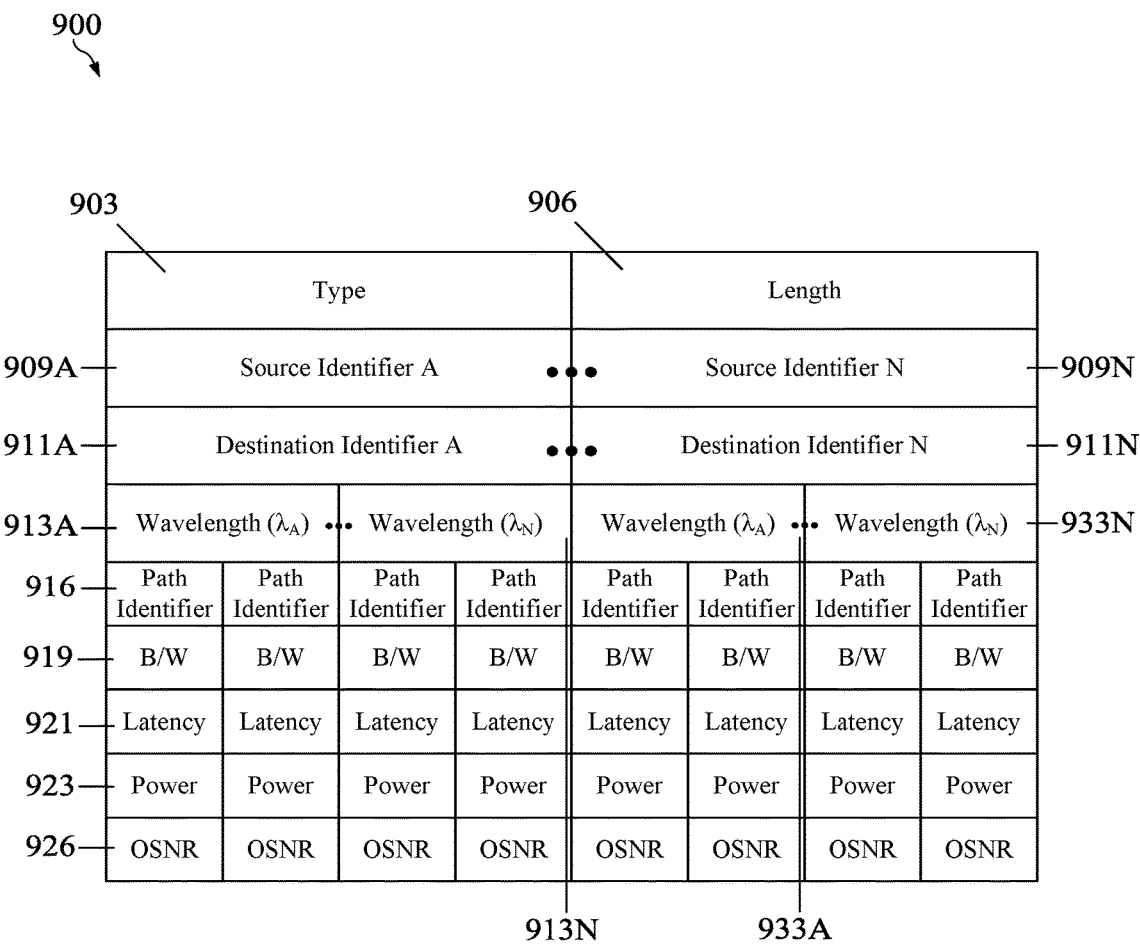
FIG. 9 is type-length-value (TLV) diagram illustrating an update message according to various embodiments of the disclosure.

FIG. 9 is TLV diagram illustrating an update message according to various embodiments of the disclosure. The update message 900 is similar to the update message sent by the domain controller 120 to the super controller 112 at step 803 of the message sequence diagram 800. The update message 900 may be encoded according to various protocols, such as, for example, PCEP, Network Configuration Protocol (NETCONF), or YANG data model. For example, the update message 900 may be similar to the update request for the PCEP, as described by IETF RFC 5440, which is already incorporated by reference above.

In some embodiments, the update message 900 comprises a type field 903 and a length field 906. The type field 903 may be a value that indicates that the update message 900 contains the information shown in FIG. 9. The value may be set by the Internet Assigned Numbers Authority (IANA). The length field 906 may be 16 bits that indicates a total length of the update message 900.

As shown by FIG. 9, the update message 900 includes the path information regarding paths for many different wavelengths by which data can be transported between a source 113 and destination 114. The update message 900 may also include this information for multiple different variations of source 113 and destination 114 pairs, as shown by FIG. 9. In this way, the update message 900 includes one or more source identifier fields 909A-N and one or more destination identifier fields 911A-N. The source identifier fields 909A-N carry 32 bit identifiers of the different sources 113, and the destination identifier fields 911A-N carry 32 bit identifiers of the different destinations 114. A source 113 and destination 114 pair may be identified by the same alphabetic character. For example, the identifier of the source 113 carried by the source identifier field 909A and the identifier of the destination identifier field 911A are identifiers of a single source 113 and destination 114 pair.

In some embodiments, the update message 900 may carry information regarding many different paths for each of the wavelengths ($\lambda_{A-N}$) available for each source 113 and destination 114 pair in a domain. The update message 900 shows that, for the source 113 identified in the source identifier field 909A and the destination 114 identified in the destination identifier field 911A, there may be any number of wavelengths ($\lambda_{A-N}$) 913A-N available by which to transport data. For each wavelength, many different paths may be identified and described in the update message 900, as shown in FIG. 9. For each path, the update message 900 may include various fields used to identify and describe the optical impairment data related to the path. The update message 900 may comprise a path identifier field 916 that is a 32 bit field that may carry an identifier of the path being described. For this path, the update message 900 may also comprise a bandwidth (B/W) field 919, which is a 32 bit field that carries a total bandwidth available on the path, a latency field 921, which is a 32 bit field that carries a total latency of the path, a power field 923, which is a 32 bit field that carries a total power level on the path, and an OSNR field 926, which is a 32 bit field that carries a total OSNR on the path.

As shown by FIG. 9, the path identifier field 916, the bandwidth field 919, the latency field 921, the power field 923, and the OSNR field 926 is included to describe each path in the viable path set and the parallel path set that is being sent to the super controller 112. Multiple paths may be described using these fields for each wavelength. For the source 113 and destination 114 pair identified by the source identifier field 909N and the destination identifier field 911N, there may be any number of wavelengths ($\lambda_{A-N}$) 933A-N available by which to transport data. For each of these wavelengths ($\lambda_{A-N}$) 933A-N, multiple paths may be described using the path identifier field 916, the bandwidth field 919, the latency field 921, the power field 923, and the OSNR field 926.

While only the path identifier field 916, the bandwidth field 919, the latency field 921, the power field 923, and the OSNR field 926 are described and shown in the update message 900, it should be appreciated that the update message 900 may include fields used to describe other optical impairment data.

Figure 10:
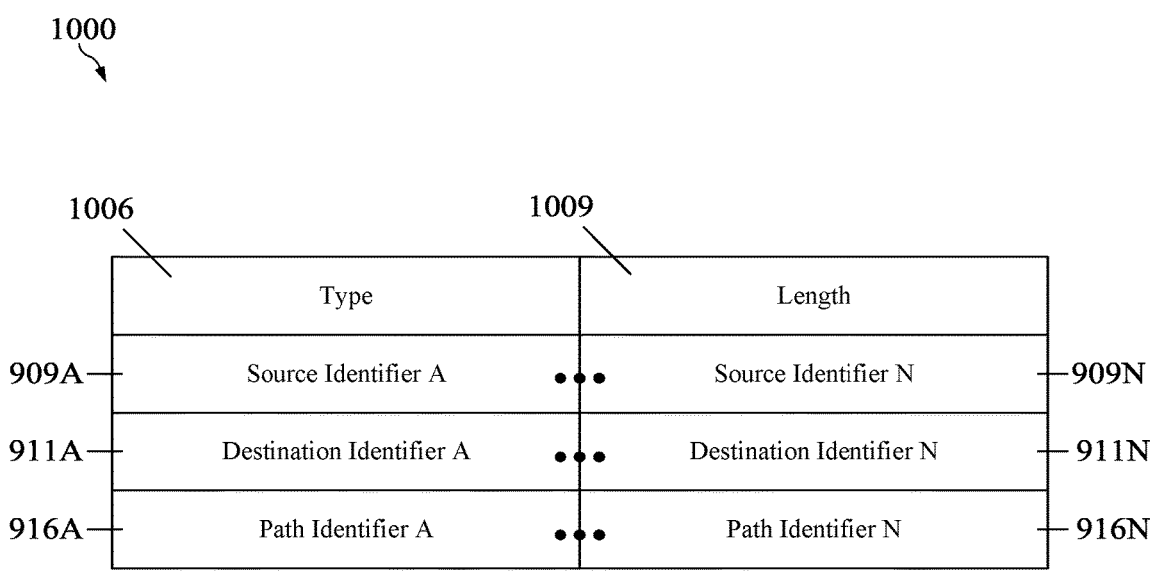
FIG. 10 is a TLV diagram illustrating an initiate message according to various embodiments of the disclosure.

FIG. 10 is a TLV diagram illustrating an initiate message 1000 according to various embodiments of the disclosure. The initiate message 1000 is similar to the initiate message sent by the super controller 112 to the domain controller 120 at step 809 of the message sequence diagram 800. The initiate message 1000 may be encoded according to various protocols, such as, for example, PCEP, Network Configuration Protocol (NETCONF), or YANG data model. For example, the initiate message 1000 may be similar to the initiate request for the PCEP, as described by IETF RFC 5440, which is already incorporated by reference above.

In some embodiments, the initiate message 1000 comprises a type field 1006 and a length field 1009. The type field 1006 may be a value that indicates that the initiate message 1000 contains the information shown in FIG. 10. The value may be set by the IANA. The length field 1009 may be 16 bits that indicates a total length of the initiate message 1000.

In an embodiment, the initiate message 1000 comprises the path identifier for the path selected based on the information provided by the update message 900. For example, the path is selected by the super controller 112 based on a customer specified network constraint. In some embodiments, the super controller 112 may select different paths for different source 113 and destination 114 pairs. As shown by FIG. 10, the initiate message 1000 carries a path identifier in the path identifier field 916A for the source 113 and destination 114 identified by the source identifier field 909A and the destination identifier field 911A. Similarly, the initiate message 1000 carries a path identifier in the path identifier field 916N for the source 113 and destination 114 identified by the source identifier field 909N and the destination identifier field 911N. While only two path identifiers for two source 113 and destination 114 pairs are identified by the initiate message 1000, the initiate message 1000 may comprise path identifiers for any number of paths for a source 113 and destination 114 pair.

Figure 11:
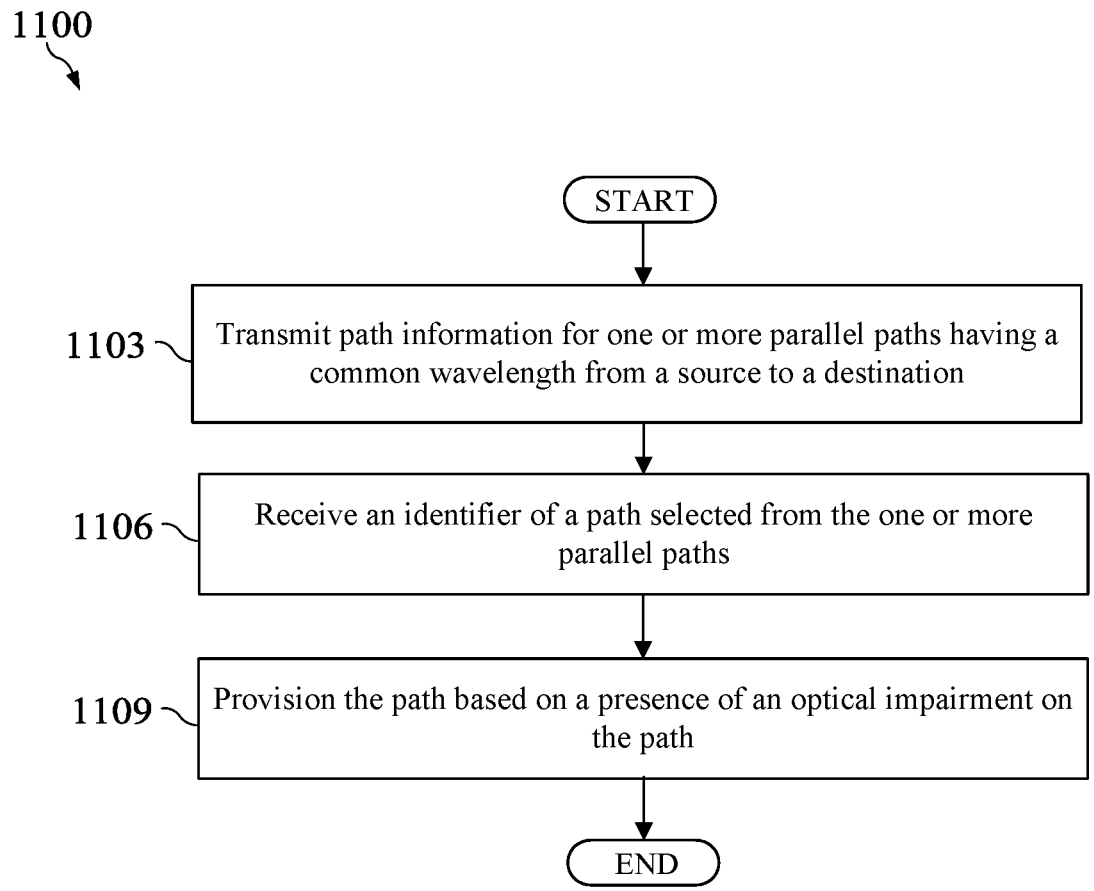
FIG. 11 is a flowchart illustrating a method for path estimation and path provisioning according to various embodiments of the disclosure.

FIG. 11 is a flowchart illustrating a method 1100 for path estimation and path provisioning according to various embodiments of the disclosure. The method 1100 may be performed by a domain controller 120 after determining the set of viable paths and parallel paths for different wavelengths available in a domain (as described above with reference to FIGS. 6A-E).

At step 1103, path information for one or more parallel paths having a common wavelength from a source 113 to a destination 114 may be transmitted. For example, a Tx 225 of the domain controller 120 may transmit the path information to the super controller 112. For example, the path information may be in the form of the update message 900 that comprises path identifiers and optical impairment data for multiple different viable paths and parallel paths determined to have a wavelength available to transport data within a domain.

At step 1106, the identifier of a path selected from the one or more parallel paths is received. For example, a Rx 220 of the domain controller 120 may receive one or more identifiers of one or more parallel paths from the super controller 112 after the super controller 112 selects the one or more parallel paths based on the path information. For example, the identifier of the path selected may be in the form of the initiate message 1000.

At step 1109, the path is provisioned based on a presence of an optical impairment on the path. For example, the path module 255 of the domain controller 120 may be executed by the processor 205 to provision the path based on whether a link 124 or node 115 on the path is optically impaired. In some embodiments, the domain controller 120 may use the TEDB 140 to determine whether a link 124 or node 115 on the path is optically impaired.

Figure 12:
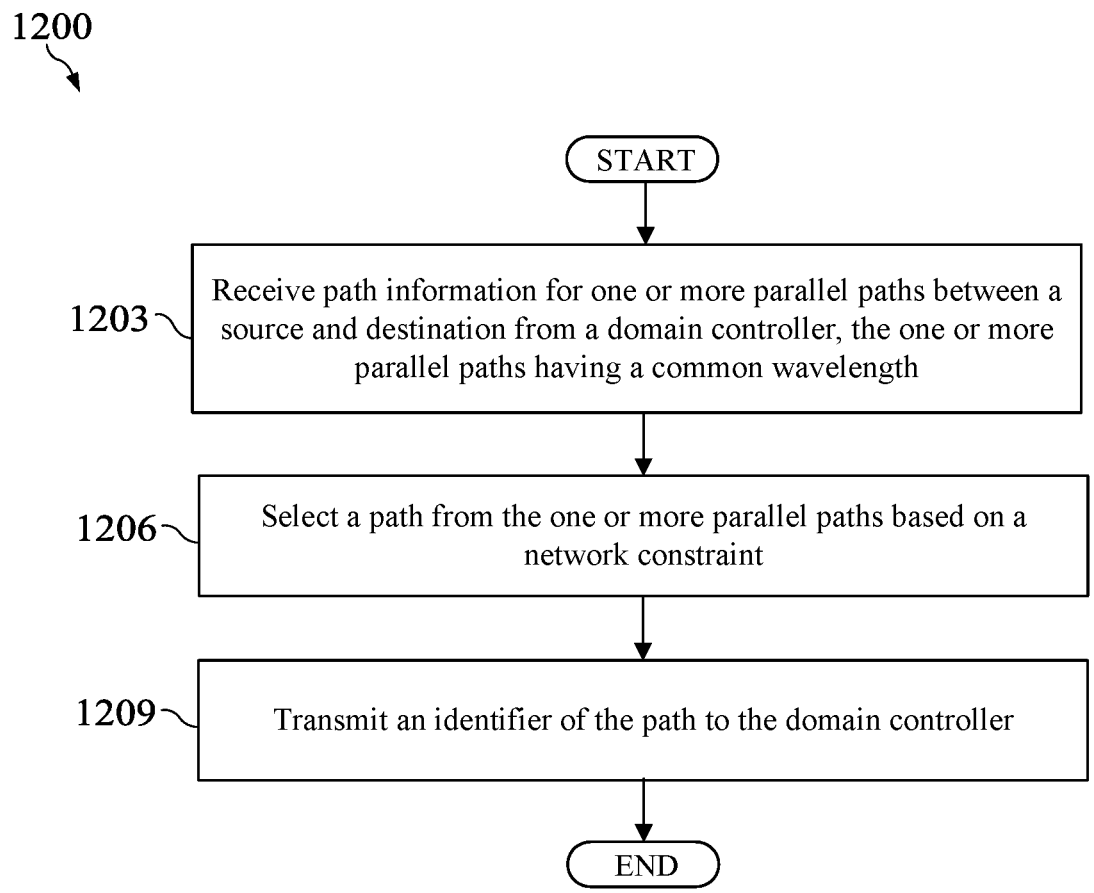
FIG. 12 is a flowchart illustrating a method for path estimation and path provisioning according to various embodiments of the disclosure.

FIG. 12 is a flowchart illustrating a method 1200 for path estimation and path provisioning according to various embodiments of the disclosure. The method 1200 may be performed by the super controller 112 after the domain controller 120 has determined the set of viable paths and parallel paths for different wavelengths available in a domain (as described above with reference to FIGS. 6A-E).

At step 1203, path information for one or more parallel paths having a common wavelength from a source 113 to a destination 114 is received. For example, a Rx 220 of the super controller 112 may receive the path information from the domain controller 120. For example, the path information may be in the form of the update message 900 that comprises path identifiers and optical impairment data for multiple different viable paths and parallel paths determined to have a wavelength available to transport data within a domain.

At step 1206, a path is selected from the one or more parallel paths based on a network constraint. For example, the path module 255 of the super controller 112 may be executed by the processor 205 to select a path from the one or more parallel paths based on the customer specified network constraint. For example, the customer specified network constraint may be a minimum latency or a maximum throughput. When the network constraint is the minimum latency, then the selected path may be the shortest path between the source 113 and the destination 114. When the customer specified network constraint is the maximum throughput, then the selected paths may be a set of parallel paths that maximizes the throughput, or the set of parallel paths with the greatest number of parallel paths.

At step 1209, an identifier of the selected path is transmitted to the domain controller 120. For example, a Tx 225 of the super controller 112 may transmit one or more identifiers of one or more parallel paths to the domain controller 120 after the super controller 112 selects the one or more parallel paths based on the path information. For example, the identifier of the path selected may be in the form of the initiate message 1000.

Figure 13:
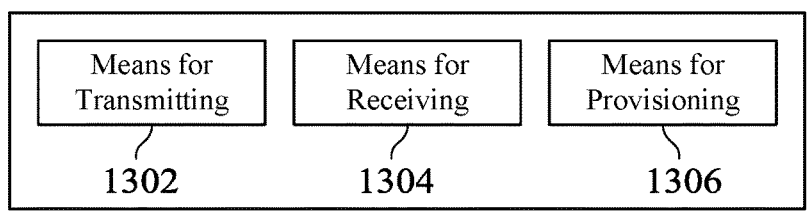
FIG. 13 illustrates an apparatus configured to implement one or more methods described herein.

FIG. 13 illustrates an apparatus 1300 configured to implement one or more methods described herein such as, for example, method 1100 of FIG. 11. The apparatus 1300 comprises a means for transmitting 1302 path information for one or more parallel paths having a common wavelength from a source to a destination, wherein the one or more parallel paths are free of optical impairments when the update message is transmitted to the super controller, a means for receiving 1304 an identifier of a path selected from the one or more parallel paths, and a means for provisioning 1306 the path based on a verification that the path selected by the super controller is free of optical impairments.

Figure 14:
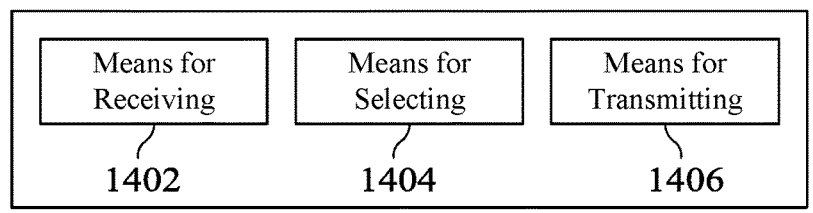
FIG. 14 illustrates an apparatus configured to implement one or more methods described herein.

FIG. 14 illustrates an apparatus 1400 configured to implement one or more methods described herein such as, for example, method 1200 of FIG. 12. The apparatus 1400 comprises a means for receiving 1402 path information for one or more parallel paths between a source and destination from a domain controller, the one or more parallel paths having a common wavelength, the one or more parallel paths being free of optical impairments when the update message is received by the super controller, a means for selecting 1404 a path from the one or more parallel paths based on a network constraint, and a means for transmitting 1406 an identifier of the path to the domain controller.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A method implemented by a domain controller in a network, the method comprising:
    transmitting, by a transmitter of the domain controller to a super controller, an update message comprising path information for a plurality of parallel paths having a common wavelength from a source to a destination, the plurality of parallel paths being free of optical impairments;
    receiving, by a receiver of the domain controller from the super controller, an initiate message comprising an identifier of a path selected from the plurality of parallel paths;
    verifying, by a processor of the domain controller, that the path is free of optical impairments; and
    provisioning, by the processor of the domain controller, the path in response to verifying that the path is free of optical impairments.

2. The method of claim 1, wherein the plurality of parallel paths comprises a first path from the source to the destination and a second path from the source to the destination, and wherein the first path comprises links that are disjoint from links on the second path.

3. The method of claim 1, wherein the path information comprises at least one of an identifier of each of the parallel paths, a bandwidth of each of the parallel paths, a latency of each of the parallel paths, an optical signal-to-noise ratio (OSNR) of each of the parallel paths, a bit error rate (BER) threshold of each of the parallel paths, a quality factor (Q-factor) of each of the parallel paths, or a power level at each of the parallel paths.

4. The method of claim 1, wherein provisioning the path comprises provisioning, by the processor, the path for the source and the destination based on a determination that the path is free of optical impairments.

5. The method of claim 1, wherein provisioning the path comprises:
    transmitting, by the transmitter to the super controller, a failure message indicating that an optical impairment has occurred on the path; and
    receiving, by the receiver from the super controller, a second identifier of a second path selected from the plurality of parallel paths.

6. The method of claim 1, further comprising:
    determining, by the processor, a plurality of sets of parallel paths between the source and the destination having the common wavelength available; and
    determining, by the processor, an optimal set of parallel paths for the common wavelength based on a network constraint,
    wherein the path information describes each path in the optimal set of parallel paths.

7. The method of claim 6, wherein the update message further comprises path information for a plurality of viable paths between a plurality of different source and destination pairs.

8. An apparatus implemented as a super controller, comprising:
    a memory storage comprising instructions; and
    one or more processors in communication with the memory storage, wherein the one or more processors execute the instructions to:
        receive an update message comprising path information for a plurality of parallel paths between a source and destination from a domain controller, the plurality of parallel paths having a common wavelength, the plurality of parallel paths being free of optical impairments;
        select a path from the plurality of parallel paths based on a network constraint; and
        transmit an initiate message comprising an identifier of the path to the domain controller.

9. The apparatus of claim 8, wherein the plurality of processors are further configured to transmit a second identifier of a second path to the domain controller in response to receiving a failure message from the domain controller.

10. The apparatus of claim 9, wherein the failure message indicates that an optical impairment has occurred on the path, and wherein the second path is selected from the plurality of parallel paths based on the network constraint.

11. The apparatus of claim 8, wherein the initiate message further comprises a length field indicating a total length of the initiate message.

12. The apparatus of claim 8, wherein the path information comprises at least one of an identifier of each of the parallel paths, a bandwidth of each of the parallel paths, a latency of each of the parallel paths, an optical signal-to-noise ratio (OSNR) of each of the parallel paths, a bit error rate (BER) threshold of each of the parallel paths, a quality factor (Q-factor) of each of the parallel paths, or a power of each of the parallel paths.

13. The apparatus of claim 8, wherein each of the parallel paths has links that are disjoint from one another.

14. The apparatus of claim 8, wherein the plurality of processors are further configured to receive information regarding a presence of an optical impairment on the path from the domain controller.

15. A non-transitory medium configured to store a computer program product comprising computer executable instructions that when executed by a processor cause the processor to:
    transmit an update message comprising path information to a super controller, the path information being for a plurality of parallel paths having a common wavelength from a source to a destination, the plurality of parallel paths being free of optical impairments when the update message is transmitted to the super controller;

receive an initiate message comprising an identifier of a path selected from the plurality of parallel paths from the super controller;

verify that the path is free of optical impairments; and provision the path in response to the path being verified as free of optical impairments.

16. The non-transitory medium of claim 15, wherein the plurality of parallel paths comprises a first path from the source to the destination and a second path from the source to the destination, and wherein the first path comprises links that are disjoint from links on the second path.

17. The non-transitory medium of claim 15, wherein the path information comprises at least one of an identifier of each of the parallel paths, a bandwidth of each of the parallel paths, a latency of each of the parallel paths, an optical signal-to-noise ratio (OSNR) of each of the parallel paths, a bit error rate (BER) of each of the parallel paths, a quality factor (Q-factor) of each of the parallel paths, or a power of each of the parallel paths.

18. The non-transitory medium of claim 15, wherein the computer executable instructions that when executed by the processor further cause the processor to provision the path for the source and the destination based on a determination that the path is free of optical impairments.

19. The non-transitory medium of claim 15, wherein the computer executable instructions that when executed by the processor further cause the processor to:

transmit a failure message indicating that an optical impairment has occurred on the selected path to the super controller; and receive a second identifier of a second path, wherein the second path is selected from the plurality of parallel paths.

20. The non-transitory medium of claim 15, wherein the computer executable instructions that when executed by the processor further cause the processor to:

determine a plurality of sets of parallel paths between the source and the destination having the common wavelength available; and determine an optimal set of parallel paths for the common wavelength based on a network constraint, wherein the path information describes each path in the optimal set of parallel paths.

\* \* \* \* \*